US007450160B2

(12) United States Patent
Takahashi et al.

(10) Patent No.: US 7,450,160 B2

(45) Date of Patent: Nov. 11, 2008

(54) AUTO WHITE BALANCE APPARATUS AND WHITE BALANCE ADJUSTING METHOD

(75) Inventors: Kazunobu Takahashi, Tokyo (JP); Sumito Yoshikawa, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 569 days.

(21) Appl. No.: 11/256,697

(22) Filed: Oct. 24, 2005

(65) Prior Publication Data

US 2006/0170789 A1 Aug. 3, 2006

(30) Foreign Application Priority Data

Jan. 31, 2005 (JP) ............................ 2005-022416

(51) Int. Cl.
*H04N 9/73* (2006.01)

(52) U.S. Cl. .................................................. 348/223.1

(58) Field of Classification Search ............. 348/223.1, 348/224.1, 225.1, 655; 382/162, 167
See application file for complete search history.

(56) References Cited

U.S. PATENT DOCUMENTS 6,407,746 B1 * 6/2002 Tanizawa .................... 348/663
7,362,356 B2 * 4/2008 Ikeda et al. .............. 348/225.1
2006/0007324 A1 * 1/2006 Takei ....................... 348/223.1
2008/0100722 A1 * 5/2008 Ikeda et al. .............. 348/223.1

FOREIGN PATENT DOCUMENTS

JP 5007369 1/1993
JP 5292533 11/1993
JP 8289314 11/1996
JP 2000092509 3/2000

* cited by examiner

*Primary Examiner*—Lin Ye
*Assistant Examiner*—Jason Whipkey
(74) *Attorney, Agent, or Firm*—Pamela R. Crocker

(57) ABSTRACT

To provide an auto white balance apparatus capable of performing stable white balance adjustment. A parent block is divided into child blocks by a block-dividing circuit 110, and a typical value is calculated every child block by a typical-value calculating circuit 120, and then the distance between the typical color difference component of each parent block and the typical color difference component of each child block is obtained on a color difference plane. A child block satisfying a condition equal to or less than a threshold value S is selected to recalculate reliability of a parent blocks by using only selected child blocks. Moreover, a white balance evaluating circuit 130 corrects reliabilities of parent blocks in accordance with the number of unselected child blocks.

16 Claims, 27 Drawing Sheets

ONE SCENE

LIGHT-SOURCE DETERMINATION RESULT

AUTO WHITE BALANCE APPARATUS AND WHITE BALANCE ADJUSTING METHOD

FIELD OF THE INVENTION

The present invention relates to an auto white balance apparatus used for an electronic still camera or a video camera.

BACKGROUND OF THE INVENTION

During use of a video camera or a digital still camera, in order to reproduce a white object as white, auto white balance adjustment is performed. In a well-known, conventional auto white balance method, the balance of RGB components (three primary color components of red, green, and blue) is adjusted so that the average of the whole image becomes achromatic. However, this method has a disadvantage in that incorrect white balance adjustment tends to be performed when a chromatic portion occupies the greater portion of an image.

This incorrect white balance adjustment is referred to as color failure. The technique disclosed in Patent Document 1 is known as an auto white balance adjustment method for reducing color failure. This technique divides an image into a plurality of blocks, calculates the average value of RGB for each block, and extracts only blocks in which the average value falls within a predetermined range. Then, RGB components are adjusted so that the average value of RGB of an extracted block group becomes achromatic.

Moreover, another auto white balance method for reducing color failure is disclosed in Japanese Patent Laid-Open Publication No. Hei 5-7369. This method avoids performance of excessive white balance adjustment by restricting a range of values which can be assumed by a white balance adjustment signal.

Although these methods are advantageous when a light source for illuminating an object is limited, sufficient balance adjustment cannot be performed when the object is illuminated by an unexpected light source or a plurality of light sources.

Therefore, in Japanese Patent Laid-Open Application Hei 8-289314 the present applicant has proposed an improved auto white balance adjusting apparatus. In this apparatus, the following block groups are extracted: a block group determined to be the result of dividing an image into a plurality of blocks and photographing a white object under fluorescent light, a block group determined to be the result of photographing a white object under daylight or tungsten light, and a block group having a color close to a brightest block in an image. Then, average values of each of RGB components on these block groups are obtained, and a value obtained by previously mixing the average values in accordance with a predetermined rule is used as a white balance adjustment signal. In this apparatus, by reflecting in a white balance signal the average value of RGB of a block group having a color close to the brightest block in an image, proper white balance adjustment can be performed even under an unexpected light source or a plurality of types of light sources.

However, because the apparatus disclosed in Japanese Patent Laid-Open Application Hei 8-289314 extracts the above block groups in accordance with only color, the value of a dark block is also used to obtain the average value of the block groups. A color appearing in an image is influenced by the color of an object and the color of a light source for illuminating the object. In this case, because a dark block often does not reflect the color of a light source, reflecting the information on the dark block in an auto-white-balance adjustment signal may lead to an error.

Therefore, in Japanese Patent Laid-Open Application 2000-92509, the present applicant has proposed a further-improved auto white balance adjusting apparatus. In this apparatus, the average value of RGB components obtained for each block obtained by dividing an image is used as the typical value of blocks; a block having the highest luminance is obtained in accordance with the typical value; and a luminance threshold value is obtained in accordance with the luminance of the highest-luminance block. Then, white balance adjustment is performed in accordance with the typical values of blocks having luminance higher than the luminance threshold value among all blocks.

SUMMARY OF THE INVENTION

In the case of the above method, the average value of RGB components of each block is simply determined as the typical value of a block for performing white balance adjustment. For example, when a chromatic object is present in each block or values of RGB in a block are not uniform, these colors are mixed, the average value of each block does not reflect the color of a light source illuminating the block, and white balance adjustment may fail to be properly applied to an input image.

Therefore, an object of the present invention is to provide an auto white balance apparatus capable of performing stable white balance adjustment even if a chromatic object is present in each block or values of RGB in a block are not uniform.

An auto white balance apparatus of the present invention uses an auto white balance apparatus for applying white balance adjustment to a picked-up image, including block-dividing means for dividing an input image into a plurality of blocks; typical-value calculating means for calculating a typical value including luminance and color difference representing a block; and white balance adjusting means for applying white balance adjustment to the image, wherein the block-dividing means includes parent block-dividing means for dividing an input image into a plurality of parent blocks, and child block-dividing means for dividing each parent block into a plurality of child blocks; the typical-value calculating means includes parent typical-value calculating means for calculating a typical value including luminance and color difference representing a child block in accordance with each color value in the child block child typical-value calculating means for calculating a typical value including luminance and color difference representing a child block, child block selecting means for selecting several desired child blocks from among a child block group included in the parent block in accordance with comparison between parent typical color difference and child typical color difference of each child block included in the parent block, and parent typical-value recalculating means for recalculating the typical value of the parent block in accordance with the typical value of each selected child block, in which the white balance adjusting means applies white balance adjustment to the image in accordance with the typical value of each recalculated parent block.

According to the present invention, the child block-dividing means divides a parent block into child blocks, the child typical-value calculating means calculates a typical value for every child block, and the child block selecting means compares the typical color difference of a parent block with the typical color difference of each child block included in the parent block, thereby selecting a child block satisfying a predetermined condition, and the parent typical-value recalculating means recalculates the typical value of the parent block by using only selected child blocks. Thereby, even if a chromatic object is present in each parent block or values of RGB in the parent block are not uniform, stable white balance adjustment can be performed.

According to one embodiment of an auto white balance apparatus of the present invention, the auto white balance apparatus further includes block reliability estimating means for obtaining, for every parent block, the difference between the color difference of a white object and the typical color difference of the parent block on a color difference plane under each light source for each assumed light source and estimating the reliability of each of the light sources illuminating a scene of each of the parent blocks in accordance with respective distances, and reliability correcting means for correcting the reliability of the parent block in accordance with the number of child blocks selected by the child block selecting means, in which the white balance adjusting means applies white balance adjustment to the image in accordance with the typical value of each of the recalculated parent blocks and the reliability of each of the corrected parent blocks.

According to the present invention, reliability correcting means corrects the reliability of a parent block in accordance with the number of child blocks selected by the child block selecting means. Thereby, it is possible to simply generate only child blocks without differentiating a parent block from a child block, obtain the typical value every child block, and perform white balance adjustment more stably than in the case of performing white balance adjustment in accordance with the typical value of each parent block calculated by the parent typical-value calculating means.

According to another embodiment of the auto balance apparatus of the present invention, the auto white balance apparatus further includes child block division determination means for determining whether to divide the image into child blocks, in accordance with the object luminance of the image. When a determination is made not to divide the image into child blocks, the white balance adjusting means applies white balance adjustment to the image in accordance with the typical value of each parent block calculated by the parent typical-value calculating means.

According to the present invention, when the child block-dividing means determines to divide an image into child blocks in accordance with the object luminance of the image, it further divides each parent block into child blocks and recalculates the typical value of the parent block. Thereby, division processing of child blocks is performed only when necessary in view of the object luminance of the image. More stable white balance adjustment can be realized as compared with the case of executing the processing for recalculating the typical value of a parent block.

According to still another embodiment of the auto white balance apparatus of the present invention, when a determination is made to divide the image into child blocks in accordance with the object luminance of the image, the child block division determination means further determines whether the light source of the image is estimated as a predetermined light source in accordance with the average of typical color differences of all parent blocks constituting the image. Only when the light source is estimated not to be the predetermined light source, the child block division determination means finally determines to divide the image into child blocks.

According to the present invention, child block division determination means determines whether the light source of an image is estimated as a predetermined light source in accordance with the average of typical color differences of all parent blocks constituting the image, and only when the light source is estimated not to be the predetermined light source, finally determines to divide the image into child blocks. Thereby, in the case of a predetermined light source by which white balance is impossible to properly adjust when dividing an image into child blocks and recalculating the typical value of a parent block, child blocks are not generated, but white balance adjustment is performed. Therefore, white balance adjustment can be performed stably for a greater variety of scenes.

According to still another embodiment of the auto white balance apparatus of the present invention, when a determination is made to divide the image into child blocks in accordance with the object luminance of the image, the child block-dividing means further determines, for every parent block, whether the light source of a parent block is estimated as a predetermined light source in accordance with the typical color difference of each parent block constituting the image and finally determines to divide into child blocks only a parent block whose light source is not estimated to be the predetermined light source.

According to the present invention, child block division determination means determines, for every parent block, whether the light source of a parent block is a predetermined light source and finally determines to divide into child blocks only parent blocks whose light source is not estimated to be the predetermined light source. Thereby, the typical value of each parent block can be efficiently obtained as compared with the case of generating child blocks on all parent blocks and recalculating typical values of the parent blocks.

DETAILED DESCRIPTION OF THE INVENTION

A first embodiment (hereafter referred to as embodiment 1) of the present invention will be described below by reference to the accompanying drawings.

Figure 1:
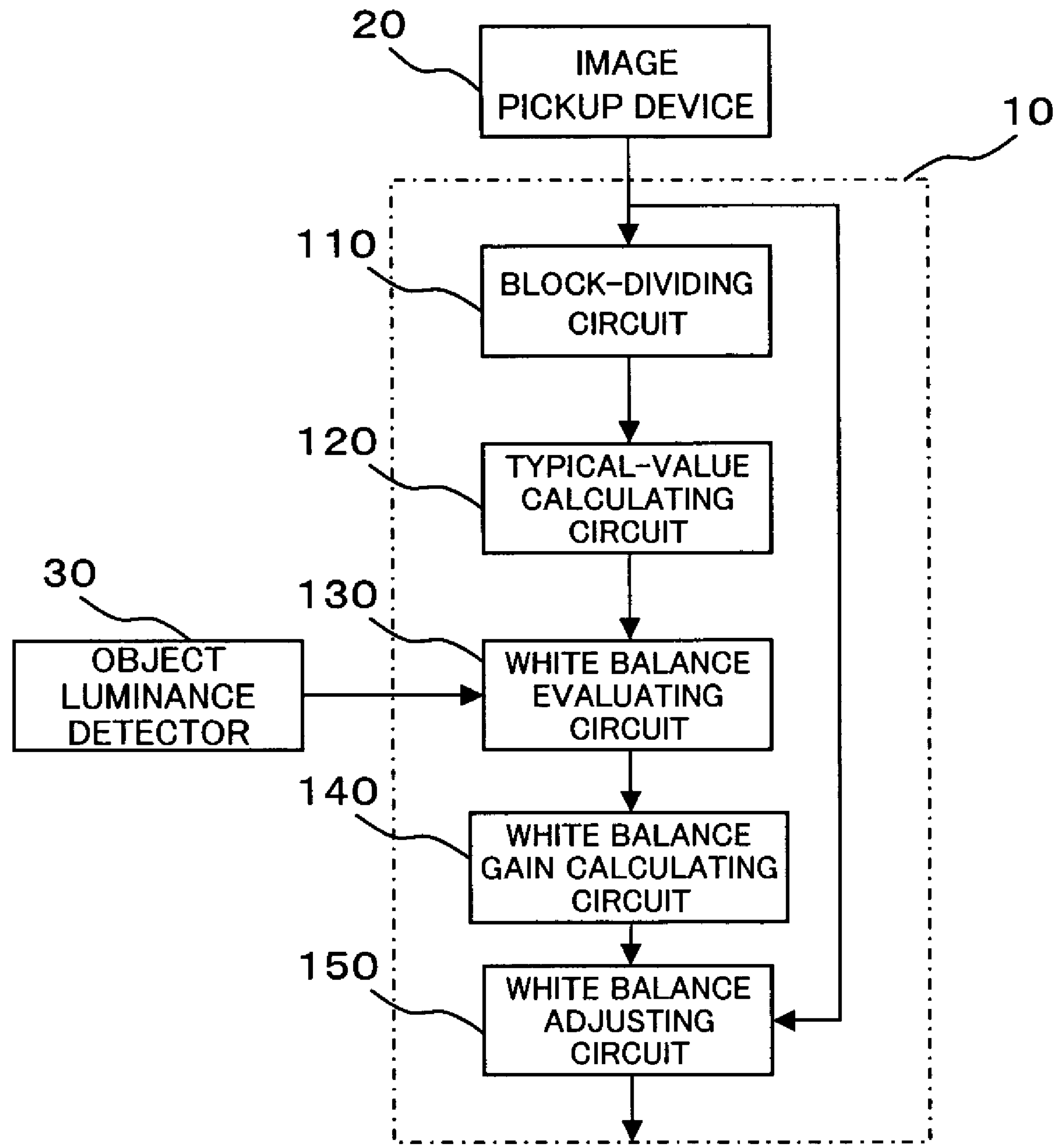
FIG. 1 is a functional block diagram showing a configuration of the auto white balance apparatus of each of embodiments 1 to 3.

FIG. 1 is a functional block diagram showing the configuration of an auto white balance apparatus 10 of embodiment 1. The auto white balance apparatus 10 is typically built into a camera such as an electronic still camera or an electronic video camera.

In FIG. 1, a block-dividing circuit 110 divides an image input from an image pickup device 20 of a camera into a plurality of blocks. Moreover, a typical-value calculating circuit 120 calculates, for every block, the average value of color values (R, G, and B) in the block and calculates luminance (L) and color difference (u,v) as values representing the block. Then, a white balance evaluating circuit 130 estimates the color of the light source of an input image in accordance with the typical value of each calculated block. A white balance gain calculating circuit 140 calculates a gain for white balance adjustment in accordance with the estimation result, and a white balance adjusting circuit 150 applies white balance adjustment to an input image in accordance with the gain.

The auto white balance apparatus 10 of embodiment 1 divides an input image into a plurality of parent blocks and moreover divides each parent block into a plurality of child blocks. Then, the apparatus 10 calculates the typical value of a parent block and, moreover, calculates the typical value every child block, and then compares the typical color difference of each parent block with the typical color difference of each child block included in the parent block, selects child blocks satisfying a predetermined condition, and recalculates the typical value of the parent block by reference to only the selected child blocks. Thereafter, the apparatus 10 applies white balance adjustment to an input image in accordance with the recalculated typical value of the parent block and the object luminance. Thus, by using the recalculated typical value of the parent block and thereby performing white balance adjustment, the apparatus 10 performs more stable white balance adjustment.

Figure 2:
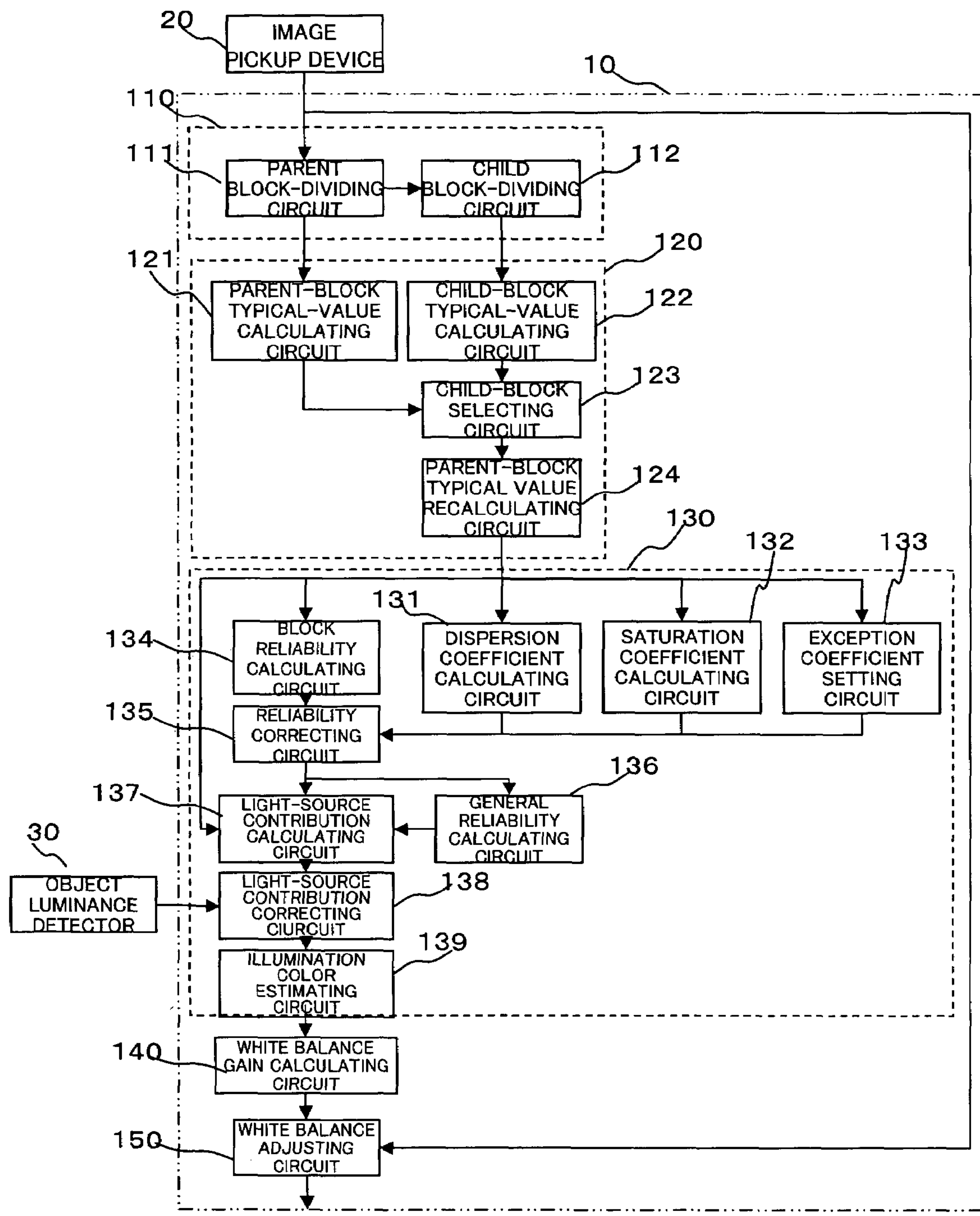
FIG. 2 is a functional block diagram showing in greater detail the configuration of the auto white balance apparatus of the embodiment 1.

Various portions of the auto white balance apparatus 10 shown in FIG. 2 are further described below by reference to a functional block diagram showing the configuration of the apparatus 10 in greater detail.

The block-dividing circuit 110 is a circuit for dividing the image data output from the image pickup device 20 into block units constituted of a predetermined pixel unit, and includes a parent block-dividing circuit 111 and a child block-dividing circuit 112.

Figure 3:
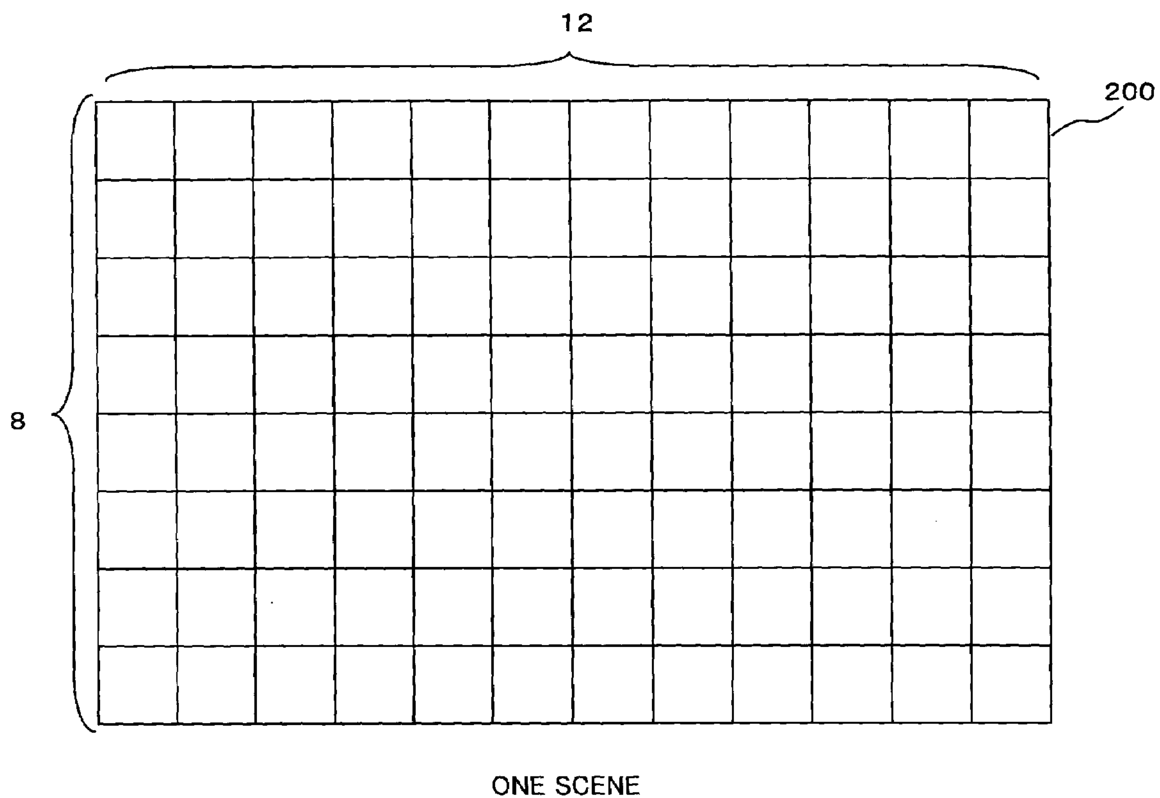
FIG. 3 is an illustration showing an example of parent block division of an input image.

The parent block-dividing circuit 111 divides the image data input from the imager pickup device 20 into M×N blocks. FIG. 3 shows an example of an image divided into parent blocks. In the case of this example, an image 200 of one frame is divided into 12×8 parent blocks by the parent block-dividing circuit 111.

Figure 4:
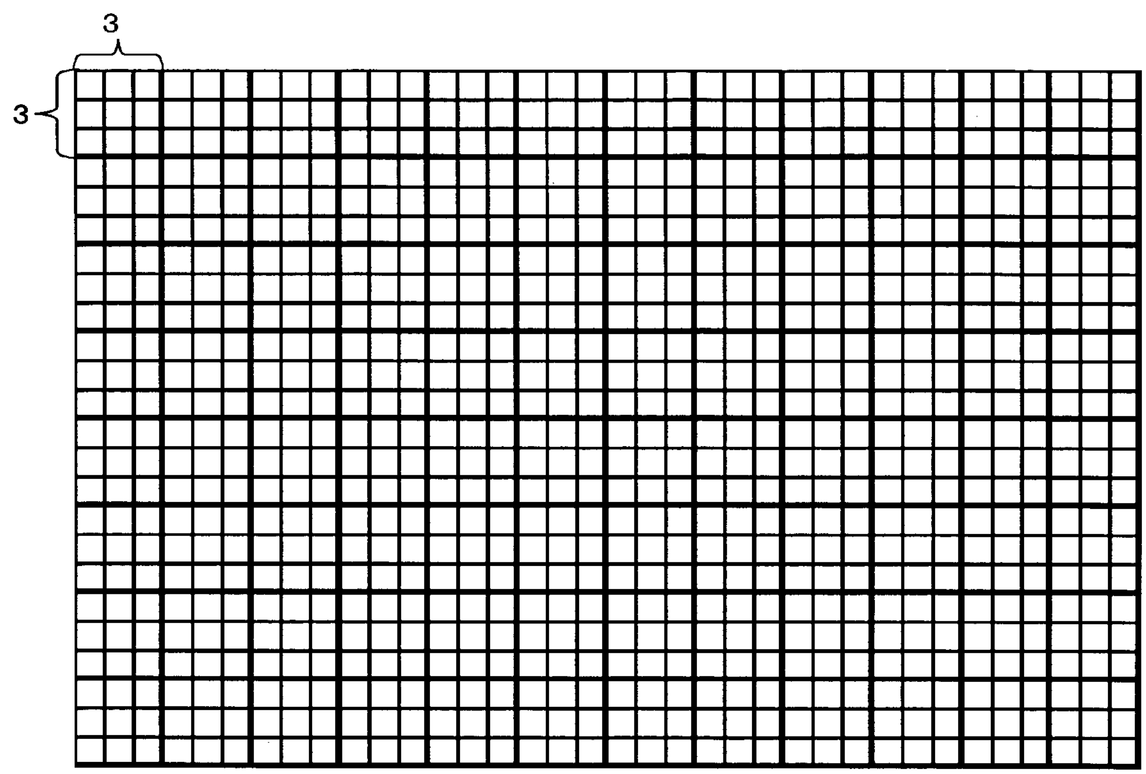
FIG. 4 is an illustration showing an example of child block division of an input image.

The child block-dividing circuit 112 further divides the image divided into parent block into L×L child blocks. FIG. 4 shows an example of an image obtained by further dividing a parent block into child blocks. In this example, a parent block is divided into 3×3 child blocks by the child block-dividing circuit 112. Block divisions shown in FIGS. 3 and 4 are examples; a division method other than that described above may be employed.

The image data of each parent block divided by the parent block-dividing circuit 111 and the image data of each child block divided by the child block-dividing circuit 112 are respectively input to the typical-value calculating circuit 120.

The typical-value calculating circuit 120 calculates, for every block, luminance and color difference representing the characteristic of an average color of the block. Hereafter, the luminance and color difference are referred to as typical luminance and typical color difference, and, moreover, the typical luminance and typical color difference are referred to as typical values.

In the typical-value calculating circuit 120, a parent-block typical-value calculating circuit 121 calculates a typical value for every parent block and a child-block typical-value calculating circuit 122 calculates a typical value for every child block. A child block selecting circuit 123 selects a child block by comparing the typical color difference of a parent block with the typical color difference of each child block. A parent-block typical-value recalculating circuit 124 calculates the typical value of a parent block again by using the typical value of each child block selected by the child block selecting circuit 123.

In this case, a method for calculating typical luminance and typical color difference for each block in the parent-block typical value calculating circuit 121 and child-block typical value calculating circuit 122 is described.

The calculating circuits 121 and 122 first obtain the average value of pixels values of all pixels for one block (parent block or child block). That is, when an image signal of the image pickup device 20 is represented by RGB (read, green, and blue), the calculating circuits 121 and 122 obtain the average value of RGB values of each pixel for all pixels on components of RGB. Then, the calculating circuits 121 and 122 apply linear conversion to the average value on luminance (L) and a set (L,u,v) of two color difference components (u,v). The conversion is shown by the following expression.

$$\begin{pmatrix} L \\ u \\ v \end{pmatrix} = \begin{pmatrix} 1/4 & 1/2 & 1/4 \\ -1/4 & 1/2 & -1/4 \\ -1/2 & 0 & 1/2 \end{pmatrix} \begin{pmatrix} R \\ G \\ B \end{pmatrix} \tag{1}$$

A conversion matrix used for conversion depends on the input color characteristic of the image pickup device 20, and the conversion matrix shown in expression (1) is only an example. Moreover, when an image signal is represented by a color system other than RGB, luminance and color-difference components can be obtained by using a conversion matrix corresponding to the color system. Moreover, a dispersion value can be obtained instead of the average value of RGB of all pixels included in a block, and the dispersion value can be calculated in accordance with the expression, to thereby obtain the typical value of each block.

Moreover, in the above description, the parent-block typical-value calculating circuit 121 simply averages the total of RGB values of all pixels constituting a parent block. Alternatively, a typical value can be obtained as described below. That is, an average value or dispersion value is obtained for every child block included in a parent block. Then, the average value or dispersion value of each obtained child block is totaled, an average is obtained by dividing the total value by the number of child blocks, and the average value is used as the typical value of a parent block.

The child block selecting circuit 123 obtains the distance between the typical color difference component of a parent block and the typical color difference component of each child block on a color difference plane to determine whether the distance is equal to or less than a predetermined threshold value S. As a result of the determination, the child block selecting circuit 123 selects from among all child blocks included in a parent block child blocks for which the distance is equal to or less than the threshold value S. That is, the child block selecting circuit 123 selects a child block similar to a parent block in terms of color difference characteristic. One value can be used for the threshold value S independently of an assumed light source. However, in the case of embodiment 1, the threshold value S is individually determined in accordance with the type of a previously-assumed light source. Then, the child block selecting circuit 123 estimates a light source for every parent block and selects child blocks in accordance with the threshold value S corresponding to the estimated light source. As light sources estimated by the child block selecting circuit 123, daylight, tungsten light (e.g. incandescent light), and fluorescent light are assumed. These are generally used as illumination light sources for still photography and video photography by a general user.

Figure 5:
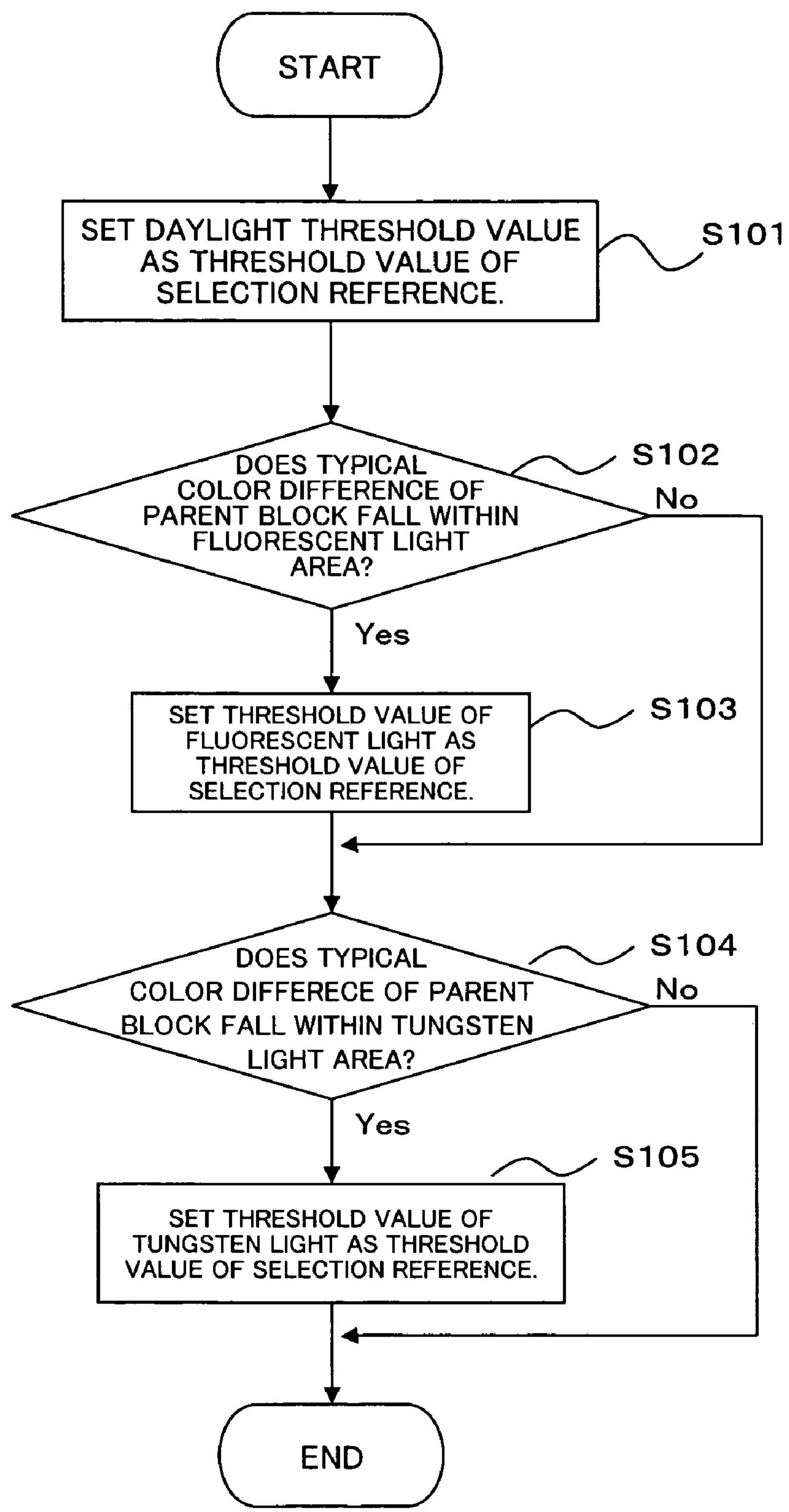
FIG. 5 is a flowchart showing a procedure of threshold value setting performed by a child block selecting circuit.
Figure 6:
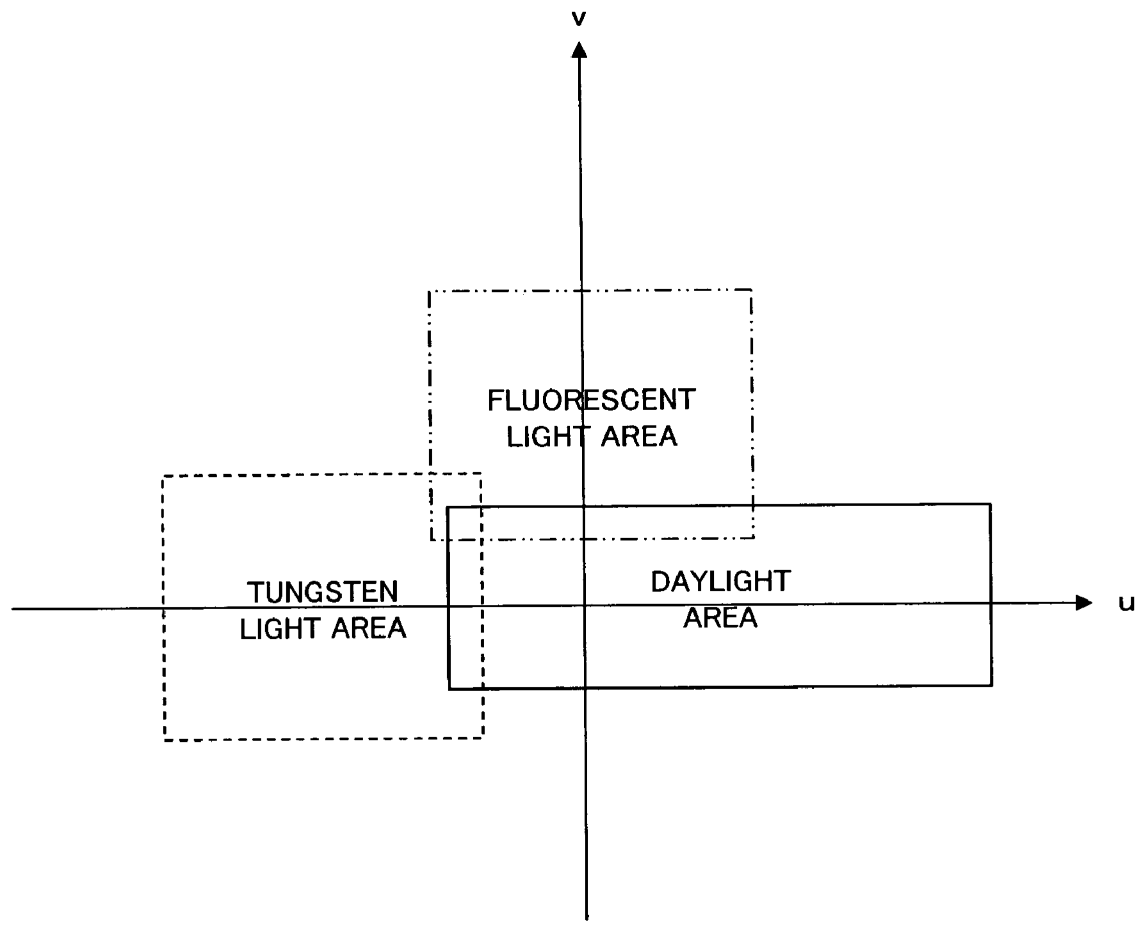
FIG. 6 is an illustration showing an example of each light source area defined on a color difference plane.

A threshold-value setting procedure performed by the child block selecting circuit 123 is described below by reference to FIGS. 5 and 6. FIG. 5 is a flowchart showing a threshold-value setting procedure performed by the child block selecting circuit 123. FIG. 6 is an illustration showing an example of a color difference plane used for the child block selecting circuit 123 to estimate the light source of a parent block, in which a daylight area, a fluorescent light area, and a tungsten light area are defined on the color difference plane. The child block selecting circuit 123 estimates a light source for every parent block by collating in which area the typical color difference component (u0,v0) of each parent block is included on the color difference plane. Each of the above areas can be determined by previously performing experiments.

In FIG. 5, the child block selecting circuit 123 first sets a threshold value determined for daylight as the threshold value S for a certain parent block (S101). Then, the child block selecting circuit 123 determines whether the typical color difference component (u0,v0) of the parent block is included in the fluorescent light area on the color difference plane (S102). As a result of the determination, when the component (u0,v0) is included in the fluorescent light area, the circuit 123 sets the threshold value of fluorescent light as the threshold value S of the parent block (S103). Then, regardless of the determination result in S102, the child block selecting circuit 123 determines whether the typical color difference component (u0,v0) of the parent block is included in the tungsten light area on the color difference plane (S104). As a result of the determination, when the component (u0,v0) is included in the tungsten light area, the circuit 123 sets the threshold value of the tungsten light as the threshold value S of the parent block (S105). By executing the above procedure for every parent block, the child block selecting circuit 123 sets the threshold value S serving as a reference when selecting a child block. As the magnitude of a threshold value, set values become larger in the sequence of fluorescent light, tungsten light, and daylight. In this case, the threshold value of fluorescent light is set to the smallest value among light sources in order to more be more strict in selecting a child block when a light source is fluorescent light. This is because the color characteristic of fluorescent light is similar to the color characteristic of a green object, and the frequency of mixing light sources is high when photographing the scene of a forest in which green objects are generally present.

Figure 7:
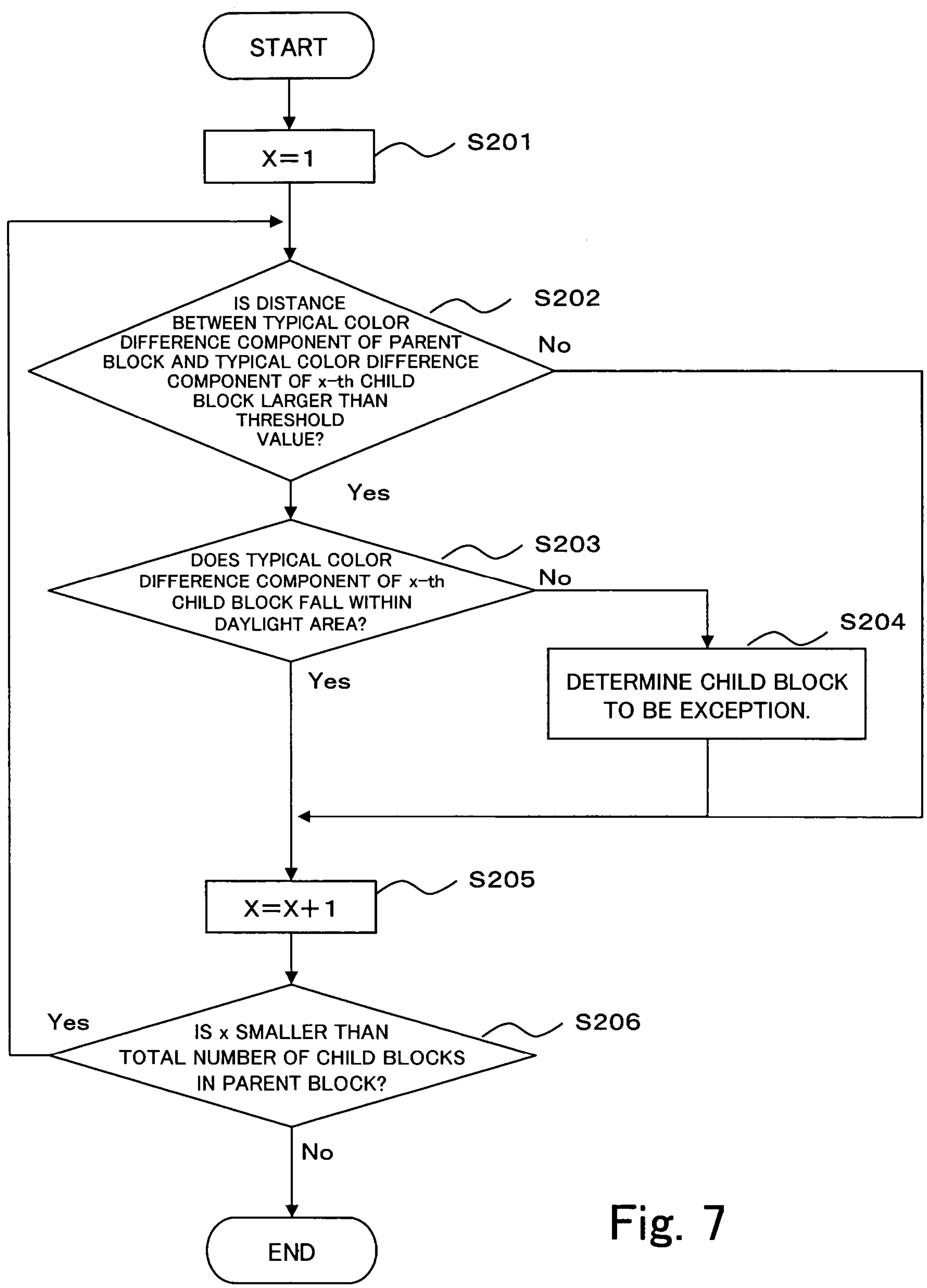
FIG. 7 is a flowchart showing a procedure of child block selection performed by a child block selecting circuit.

Moreover, the child block selecting circuit 123 selects child blocks for every parent block after the threshold value of each parent block is set. Thus, a procedure for selecting a child block is described below by reference to the flowchart shown in FIG. 7.

The child block selecting circuit 123 first sets a variable X to an initial value "1" (S201) to obtain the distance between the typical color difference component (u0,v0) of a parent block and the typical color difference component (uX,vX) of the X-th child block included in the parent block to determine whether the distance is larger than the threshold value set to the parent block (S202). This determination is performed in accordance with the below expression.

$$(u0-uX)^2+(v0-vX)^2>S^2 \tag{2}$$

As a result of the determination in S202, when a distance s is larger than the threshold value S, the circuit 123 determines whether the typical color difference component (uX,uX) of the X-th child block is present in the daylight area on the color difference plane (S203). When a result of the determination shows that the component (uX,vX) is not present in the daylight area, the circuit 123 estimates that the light source of the X-th child block is not daylight, determines the X-th child block to be an exception not used for calculation of the typical value of a parent block (S204), and adds 1 to the variable X (S205). Then, the circuit 123 determines whether the added variable X is smaller than the total number of child blocks included in a parent block, and when the variable X does not reach the total number of child blocks, performs on the next child block processing in and after S202. Moreover, when a result of the determination in S203 shows that the component (uX,vX) is present in the daylight area; for example, when the distance s is larger than the threshold value S, the circuit 123 executes processing in and after S205 without determining the child block to be an exception. The reason for not determining the child block to an exception is described below.

That is, in the case of a conventional auto white balance adjustment process, the light source of a daylight scene (such as the scene of a forest) including many comparatively-dark and green objects is estimated as not daylight but fluorescent light, because the color difference component of green and that of fluorescent light have values close to each other, and consequently incorrect white balance adjustment is executed. An object of this embodiment is to reduce the frequency of incorrect white balance adjustment. Therefore, in the case of embodiment 1, child blocks including color difference components estimated as daylight are used in as great a number as possible, so that the auto white balance apparatus 10 can easily determine the scene as daylight, and when a typical color difference component is present in a daylight area, the child block selecting circuit 123 does not determine the child block to be an exception even if the distance s is larger than the threshold value S.

Thus, the child block selecting circuit 123 performs, for each parent block, the processing for selecting child blocks, determines a child block which is an exception, and provides the information for the parent-block typical-value recalculating circuit 124. Moreover, the child block selecting circuit 123 counts exception child blocks of each parent block and provides the count value to an exception coefficient setting circuit 133 described below. The exception coefficient setting circuit 133 obtains an exception coefficient Cd in accordance with the counted value. A reliability correcting circuit 135 corrects the reliability of each parent block by reference to the exception coefficient Cd. The reliability correction will be described later in detail.

The parent-block typical-value recalculating circuit 124 freshly calculates the typical value of each parent block by excluding exception child blocks. That is, the circuit 124 obtains an average value by totaling typical values of the child blocks which do not become exceptions and dividing the total value by the total number of child blocks which do not become exceptions, and uses the average value as a new typical value of a parent block.

Figure 8:
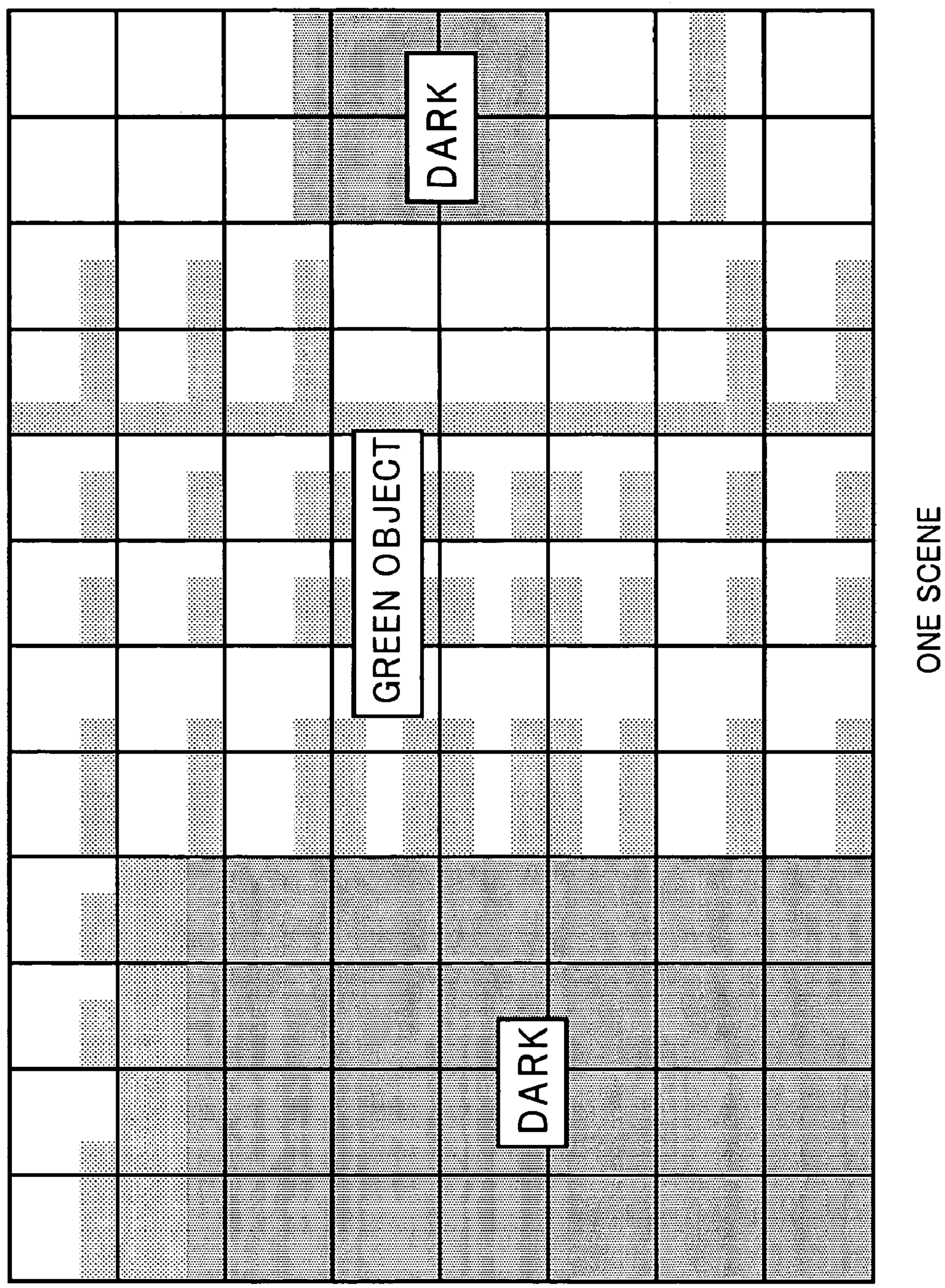
FIG. 8 is an illustration showing an example of image data in which green objects such as trees are present in the whole scene.

Thus, an advantage realized when the parent-block typical-value recalculating circuit 124 freshly calculates the typical value of each parent block by excluding exception child blocks is described for the scene shown in FIG. 8.

Figure 9:
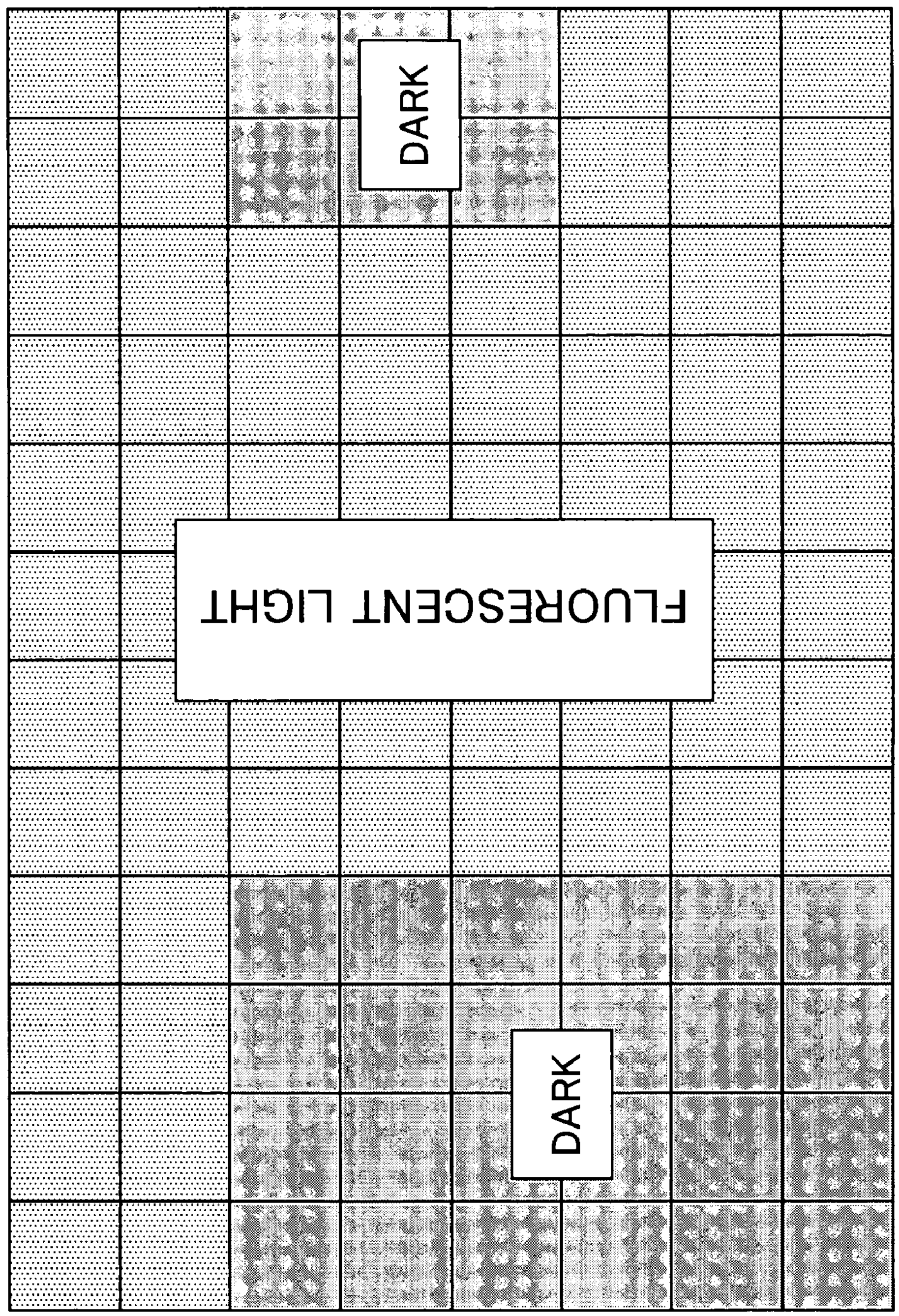
FIG. 9 is an illustration showing an example of a light-source determination result when only parent blocks are generated and typical values of the parent blocks are calculated.

FIG. 8 shows an example of image data in which green objects such as trees are present in the entire scene. When the typical value of each parent block is obtained in accordance with the average value of luminance and color differences of all pixels in a parent block and estimating a light source in accordance with the typical value, the determination result shown in FIG. 9 may be obtained. In this case, “fluorescent light” denotes a block for which fluorescent light is determined to be a light source, and “Dark” denotes a block which is not used as a light source because it is dark. When performing white balance adjustment in accordance with the light source estimation result, white balance is performed in order to correct green of fluorescent light. Therefore, the whole image is strongly corrected in the direction of violet. The error of the light-source estimation is a phenomenon arising from the color characteristic that the color difference of a green object has close values for the color difference in the case of daylight and the color difference in the case of fluorescent light, which is calculated by averaging luminances and color differences of all pixels in a block including pixels respectively having a color difference component of incorrectly determining a light source as fluorescent light.

Figure 10:
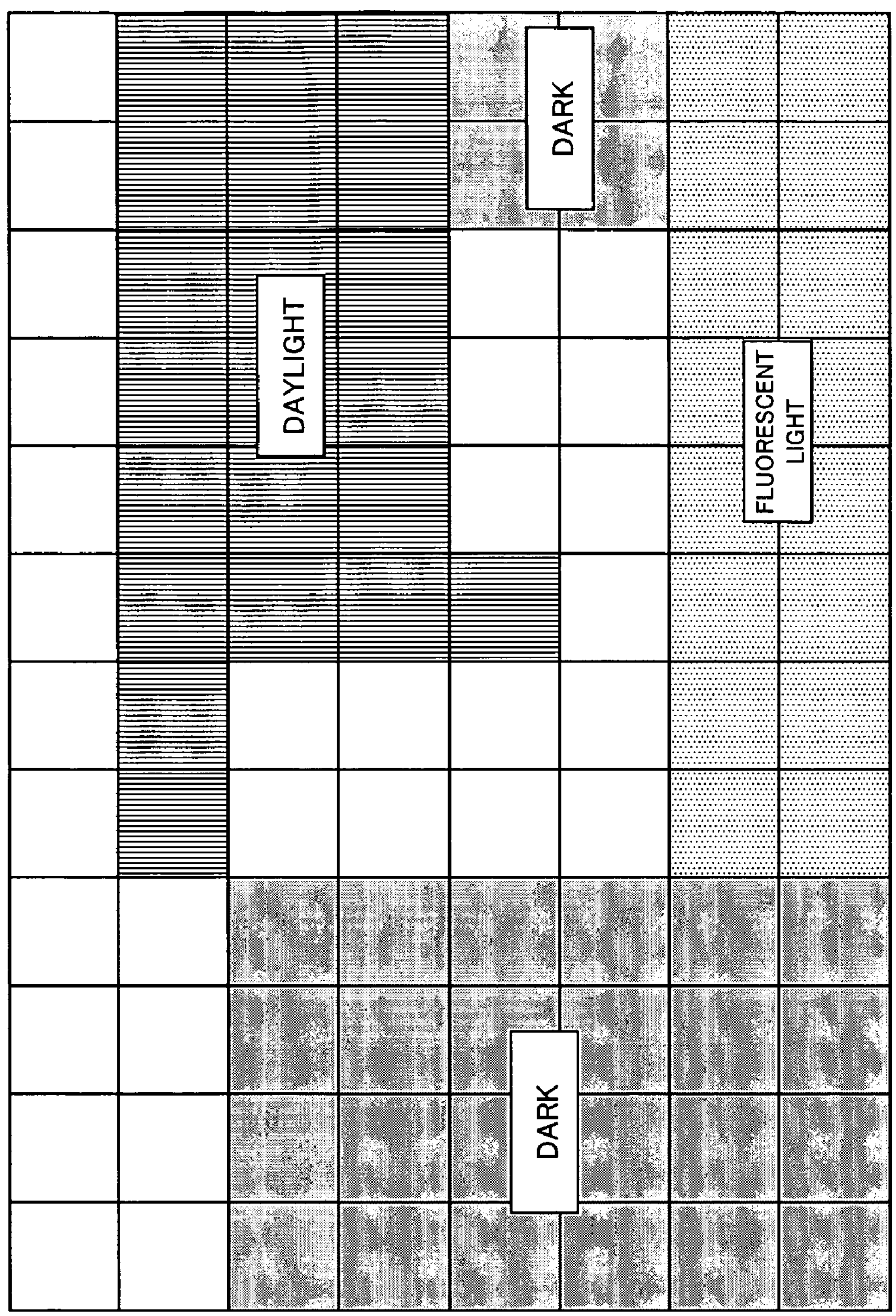
FIG. 10 is an illustration showing an example of a light-source determination result when child blocks are generated and the typical value of a parent block is recalculated.

In the case of embodiment 1, because child blocks are selected by the child block selecting circuit 123, pixels respectively having the color difference component of fluorescent light are excluded from a pixel group present in a block, and the typical value of a parent block is calculated. Therefore, when estimating the light source of each block in the scene shown in FIG. 8, a determination result is obtained in which a plurality of blocks to be determined as “daylight” are present as shown in FIG. 10. Therefore, the number of blocks in which a light source is erroneously determined as fluorescent light is decreased, white balance is performed to correct green of fluorescent light, and it is possible to prevent the case where the whole image is strongly corrected in the direction of violet.

As described above, the typical value of each parent block recalculated by the parent-block typical value recalculating circuit 124 is input to the white balance evaluating circuit 130, and light source estimation is performed.

Circuits included in the white balance evaluating circuit 130 will now be described. A dispersion coefficient calculating circuit 131 receives the image data for each parent block from the typical-value calculating circuit 120 and obtains dispersion coefficient Cv of the parent block. The dispersion coefficient Cv is a coefficient for correcting block reliability to be described later and is determined in accordance with the dispersion of pixel value of the block concerned. The dispersion coefficient of a parent block i is represented as Cvi.

Figure 11:
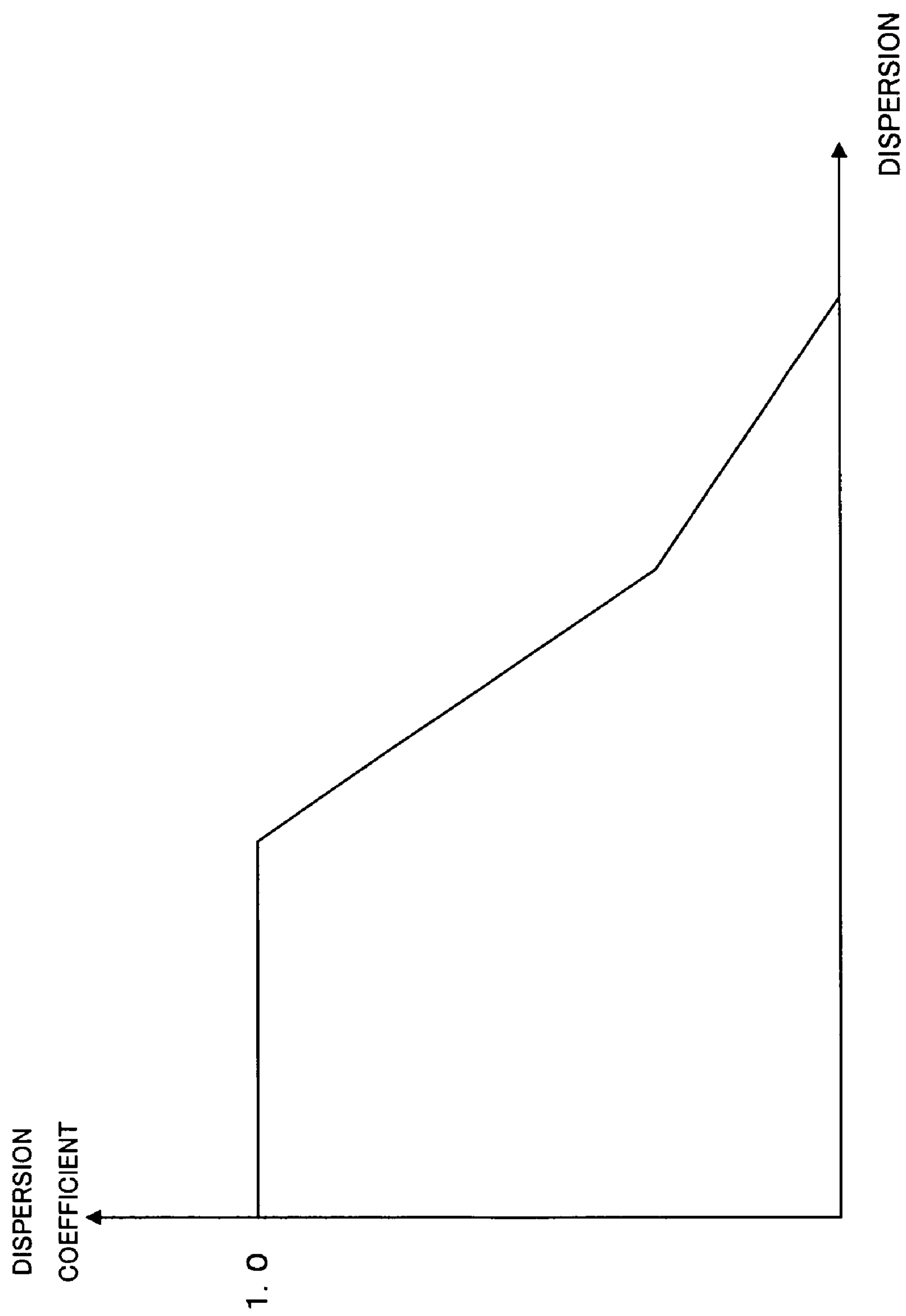
FIG. 11 is an illustration showing an example of a function for obtaining a dispersion coefficient.

The dispersion coefficient calculating circuit 131 first samples, by a predetermined method, pixels from among the pixel group of a parent block and obtains the dispersion of pixel values of the sampled pixel group. In this case, the dispersion coefficient calculating circuit 131 obtains the dispersion in the sampled pixel group on components of R, G, and B and obtains a general dispersion value by averaging dispersions of these components. The dispersion coefficient calculating circuit 131 then obtains a dispersion coefficient in accordance with the thus-obtained dispersion value. The dispersion coefficient Cv is obtained by use of a prepared function. FIG. 11 is a graph showing an example of the function. As shown in FIG. 11, the dispersion coefficient calculating circuit 131 uses a function in which, as a dispersion value increases, a dispersion coefficient corresponding to the dispersion value decreases. The function is previously entered in the dispersion coefficient calculating circuit 131.

A saturation coefficient calculating circuit 132 receives the image data for each parent block from the typical-value calculating circuit 120 and obtains the saturation coefficient Cs of the parent block. The saturation coefficient Cs is a coefficient for correcting block reliability to be described later and is determined in accordance with the number of saturated pixels in the block concerned. A saturated pixel is a pixel in which a component of a pixel value (for example, R, G, or B) is 1 or more and reaches the upper limit value of the component (for example, 255 in the case of 8-bit expression). The saturation coefficient of the parent block i is represented as Csi.

Figure 12:
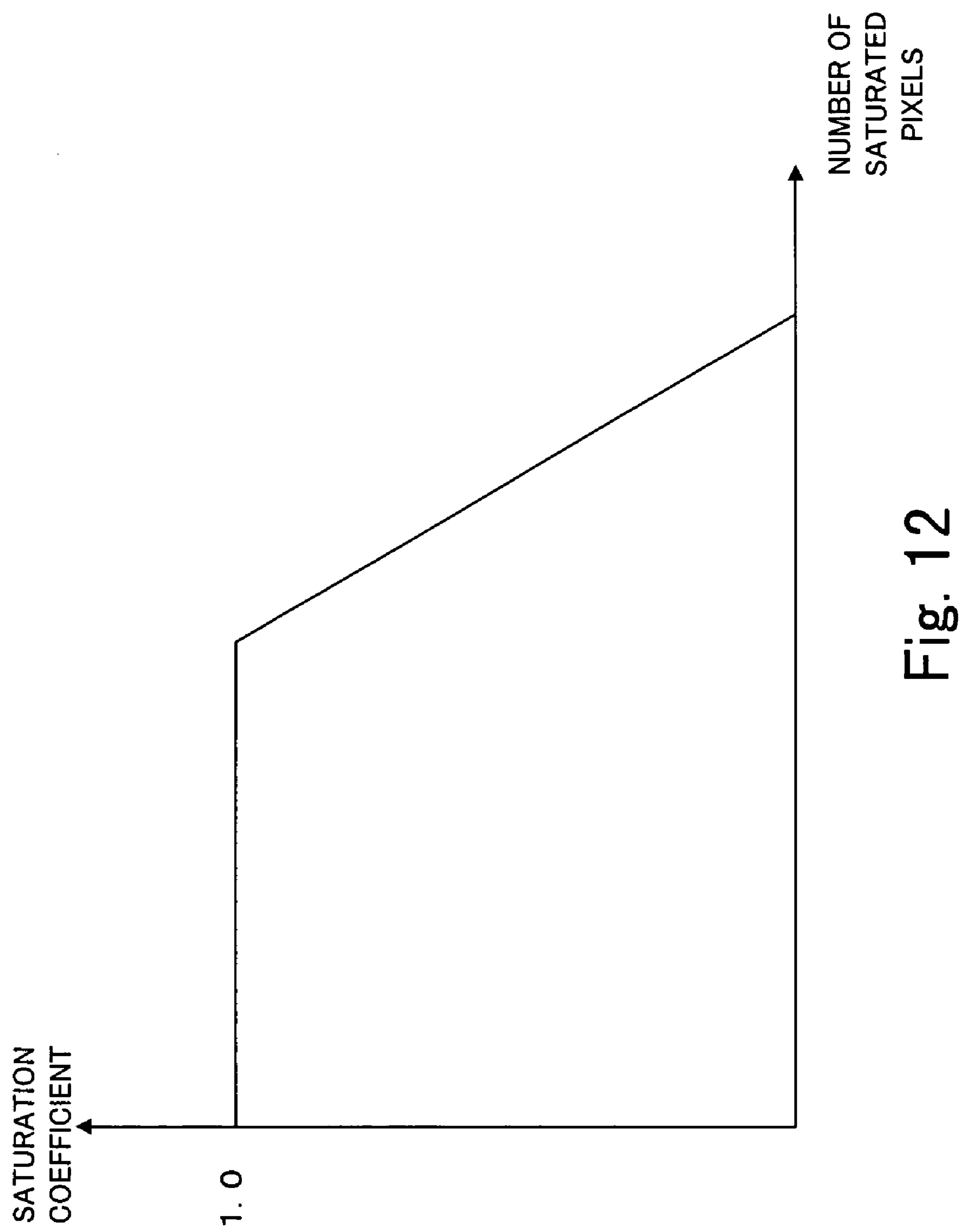
FIG. 12 is an illustration showing an example of a function for obtaining a saturation coefficient.

The saturation coefficient calculating circuit 132 first counts the number of saturated pixels in a block and obtains a saturation coefficient from the counted result. The saturation coefficient Cs is obtained by use of a prepared function. FIG. 12 is a graph of an example of the function. As shown in FIG. 12, the saturation coefficient calculating circuit 132 uses a function in which, as the number of saturated pixels increases, a saturation coefficient corresponding to the number of saturated pixels decreases. A function used here is previously entered in the saturation coefficient calculating circuit 132.

The exception coefficient setting circuit 133 obtains the exception coefficient Cd for every parent block. The exception coefficient Cd is a coefficient for correcting block reliability to be described later, which is a coefficient determined for every parent block in accordance with the number of child blocks E not selected by the child block selecting circuit 123. The exception coefficient Cd is determined in accordance with the conditions shown below.

When Ei>threshold value A, Cdi=¼

When Ei>threshold value B, Cdi=0

In this case, the threshold value A is smaller than the threshold value B, Ei denotes the number of child blocks which are considered to be exceptions in the parent block i, and Cdi denotes an exception coefficient in the parent block i.

Therefore, for example, when the threshold value A is equal to 2 and the threshold value B is equal to 4 and the number of child blocks determined to be exceptions in a parent block is "1," the exception coefficient Cd of the parent block becomes "¼," and when the number of child blocks is "5," the exception coefficient Cd becomes "0."

As described above, the dispersion coefficient Cv, the saturation coefficient Cs, and the exception coefficient Cd obtained by the dispersion coefficient calculating circuit 131, the saturation coefficient calculating circuit 132, and the exception coefficient setting circuit 133, respectively, are input to a reliability correcting circuit 135.

A block reliability calculating circuit 134 obtains the reliability when a light source illuminates a block on each light source previously assumed for each parent block. The block reliability of a certain block is obtained for each assumed light source. This processing is described below in detail.

Embodiment 1 assumes sunlight, tungsten light (e.g. incandescent light), and fluorescent light as light sources. Moreover, embodiment 1 handles sunlight by classifying it into daylight (light in daytime sunshine) and shade light (light in daytime shade). The sunshine and shade differ from each other under the same sunlight in that the former has a comparatively low color temperature (reddish) and the latter has a comparatively high color temperature (bluish). Therefore, when handled collectively, sunshine and shade may result in half-finished white balance. Moreover, soft whit balance control becomes difficult in a scene in which sunshine and shade are mixed. Therefore, embodiment 1 solves the problem by separately handling sunshine and shade as different light sources. In all, embodiment 1 assumes four types of light sources, such as daylight, shade light, tungsten light, and fluorescent light.

The block reliability calculating circuit 134 obtains the difference d between the color difference component of the color of a white object under each assumed light source (hereafter referred to as typical color difference of the light source) and the color difference component (u,v) of the typical value of a parent block calculated by the parent-block typical-value calculating circuit 124. In this case, the identification number of a light source is taken as j (j=1,2, . . . , m: m is the number of assumed light sources and is 4 in the case of the embodiment 1) to represent the light source of the identification number j as a light source j. In this case, for the sake of convenience, light source 1 is taken as daylight, light source 2 is taken as shade light, light source 3 is taken as tungsten light, and light source 4 is taken as fluorescent light. The distance Dij between the color difference component (ui,vi) of the typical value of the parent block i and the typical color difference (Uj,Vj) of the light source j is obtained from the following expression.

$$Dij=d11*(ui-Uj)^2+d12*(ui-Uj)*(vi-Vj)+d22*(vi-Vj)^2 \quad (3)$$

In this case, d11, d12, and d22 are predetermined constants. By selecting a set of these constants d11, d12, and d22 in accordance with the characteristic of each light source, a proper distance suitable for a light source characteristic can be defined. In this case, values of these constants are previously obtained through experiments and stored in a memory (such as ROM, not illustrated) set to the block reliability calculating circuit 134 or a camera. Moreover, an expression other than the above expression (3) may be used for definition of a distance. In this case, a different definitional equation of distance corresponding to the characteristic of each light source can also be used. Calculation of the above distance d is performed on all assumed light sources j for one parent block i.

Then, the block reliability calculating circuit 134 obtains reliability Rdij from the obtained distance Dij when the parent block i is illuminated by the light source j. The reliability Rdij is reliability viewed from the viewpoint of color difference. The reliability Rdij is obtained from the distance Dij by use of a predetermined function f. Because the relation between the distance d and the reliability Rd depends on the type of a light source, the function is preferably prepared individually for each light source j. When a reliability function on the light source j is taken as fj, the reliability Rdij when a parent block is illuminated by the light source j is obtained from the following expression.

$$Rdij=fj(Dij) \quad (4)$$

Figure 13:
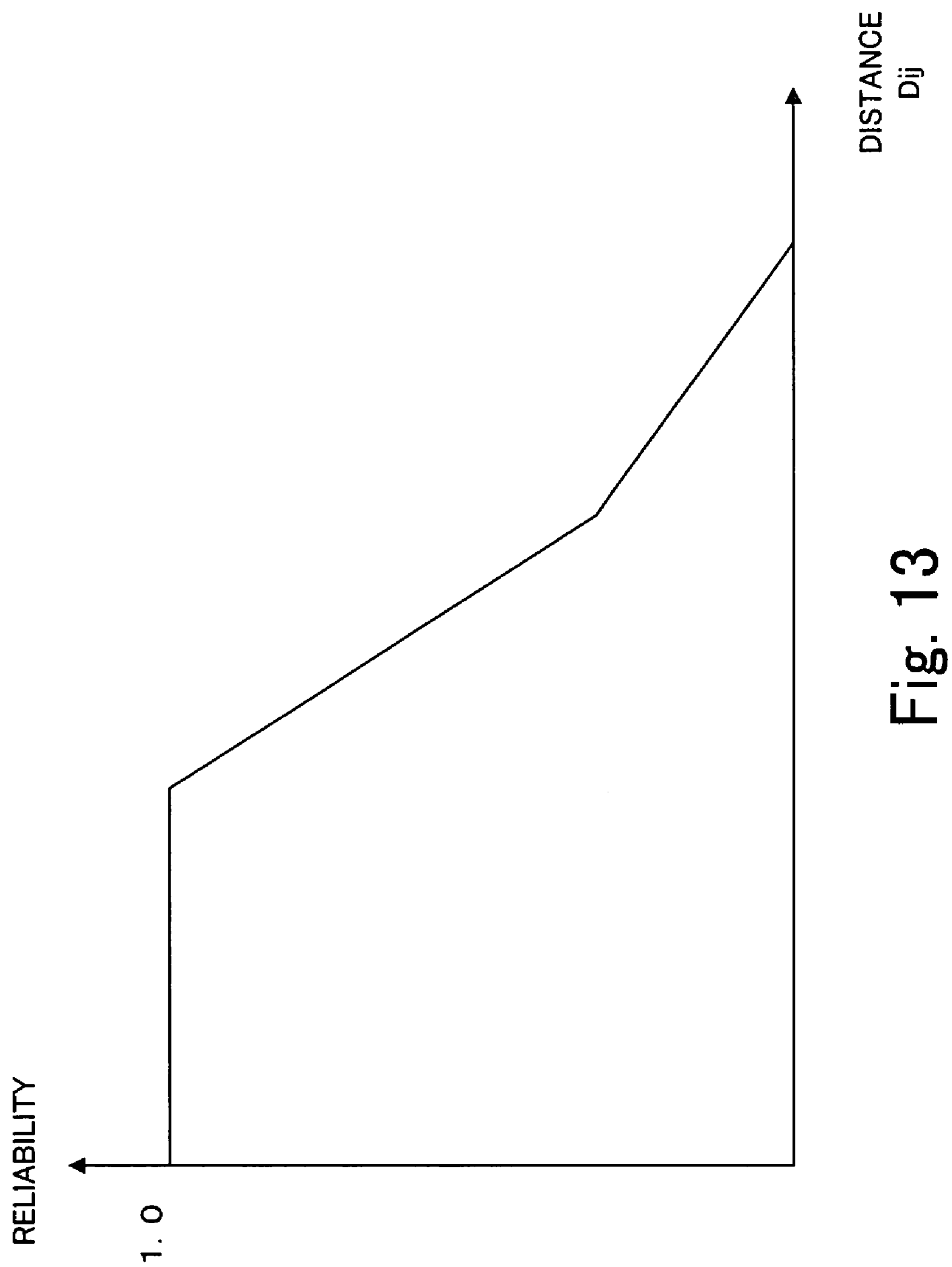
FIG. 13 is an illustration showing an example of a function for obtaining block reliability.

FIG. 13 shows an example of the reliability function fj. As shown in FIG. 13, the function fj is a function which decreases as the distance Dij increases. By setting the function to a function that continuously changes with distance, problems of the prior art are avoided by using a binary discriminating result as a base. The reliability function fj of each light source is previously obtained through an experiment and stored in an apparatus.

Moreover, from the viewpoint of the thus-obtained color difference, the block reliability calculating circuit 134 corrects the reliability Rd from the viewpoint of luminance. This is because the distribution of brightnesses of a white object under fluorescent light, distribution of brightness of a white object under direct sunlight, and distribution of brightness of a white object under shade differ from each other. Therefore, it is possible to obtain the probability that the parent block i is illuminated by the light source j in accordance with the luminance (brightness) Li of the parent block i. In this case, the reliability Rd according to the previously obtained color difference is corrected by using the probability as a coefficient.

Therefore, the block reliability calculating circuit 134 obtains the luminance coefficient Clij representing the probability that the parent block i is illuminated by the light source j from the viewpoint of luminance every parent block i. The luminance coefficient Clij is obtained by applying the luminance Li of the parent block i to a function gj previously determined in accordance with the individual type of the light source j. That is, the coefficient Clij is obtained from the following expression.

$$Clij=gj(Li) \quad (5)$$

Figure 14:
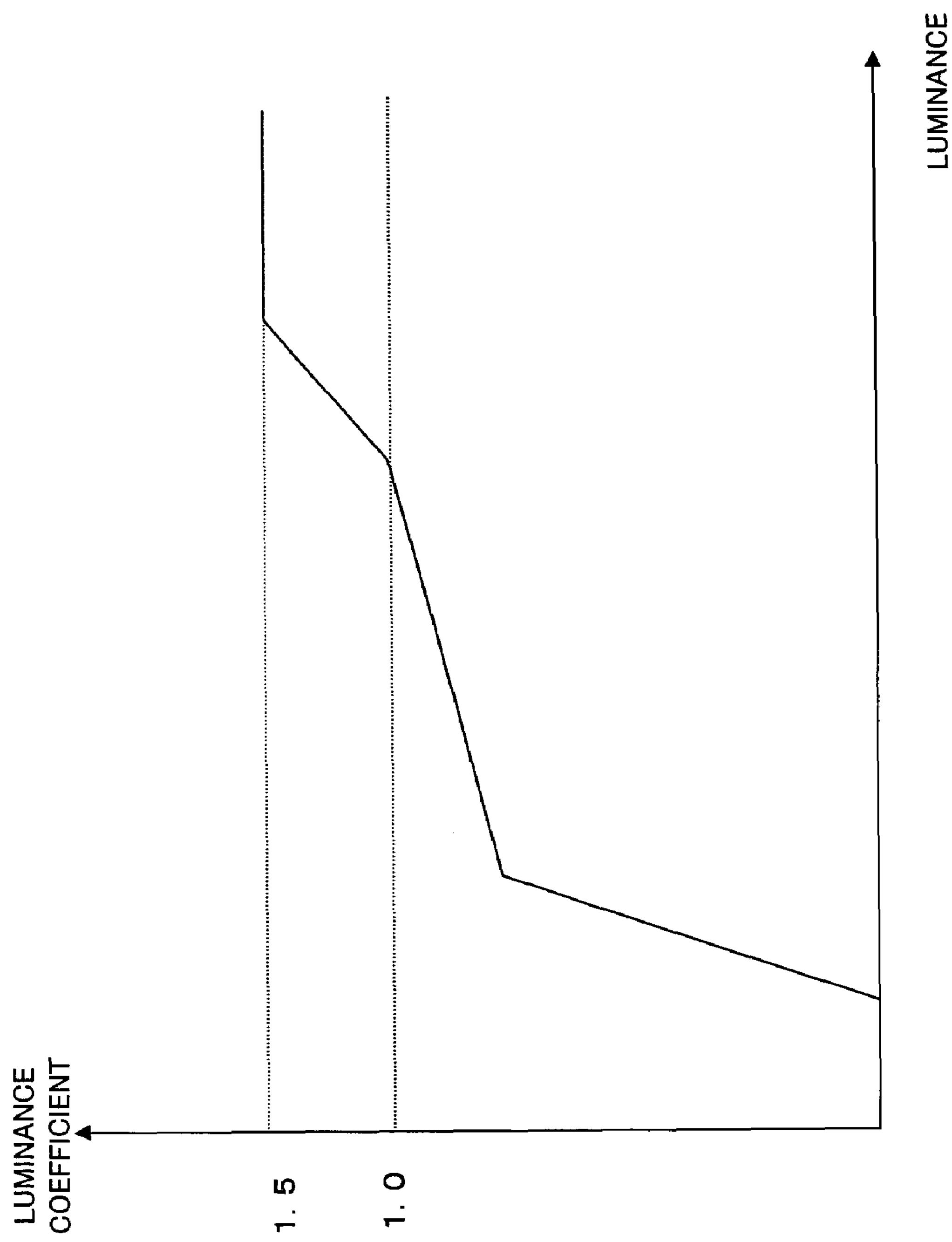
FIG. 14 is an illustration showing an example of a function for obtaining a luminance coefficient.

FIG. 14 shows an example of the function gj. The function gj is the function of the luminance Li. This example shows a function in which, as luminance increases, a coefficient Cl increases. This is because a brighter object has a high probability of being influenced by a light source. By setting the function to a function that continuously changes with luminance, the influence of the block luminance Li on white balance can be smoothed. This serves to stabilize the behavior of white balance. The characteristic of the luminance coefficient depends on the type of the light source j. The luminance coefficient function gj of each light source is previously obtained by experiment and stored in an apparatus.

Then, the block reliability calculating circuit 134 obtains the reliability Rij by multiplying the reliability Rd according to color difference by the luminance coefficient Cl. The reliability Rij is a value representing the probability that the parent block i is illuminated by the light source j as viewed from the viewpoint of both color difference and luminance. That is, the reliability Rij is obtained from the following expression.

$$Rij=Clij*Rdij \quad (6)$$

The block reliability calculating circuit 134 applies the above processing to all parent blocks i for all assumed light sources j. The information on the obtained reliability Rij is input to the reliability correcting circuit 135.

The reliability correcting circuit 135 corrects the reliability Rij of the light source j to the parent block i by the above-described dispersion coefficient Cvi, saturation coefficient Csi, exception coefficient Cdi, and the position coefficient Cpi determined in accordance with the position of the parent block i in the whole image. Specifically, by multiplying the reliability Rij by these coefficients, reliability is corrected. When the corrected reliability is taken as Rmij, Rmij is obtained from the following expression.

$$Rmij=Cvi*Cli*Cdi*Cpi*Rij \quad (7)$$

Figure 15:
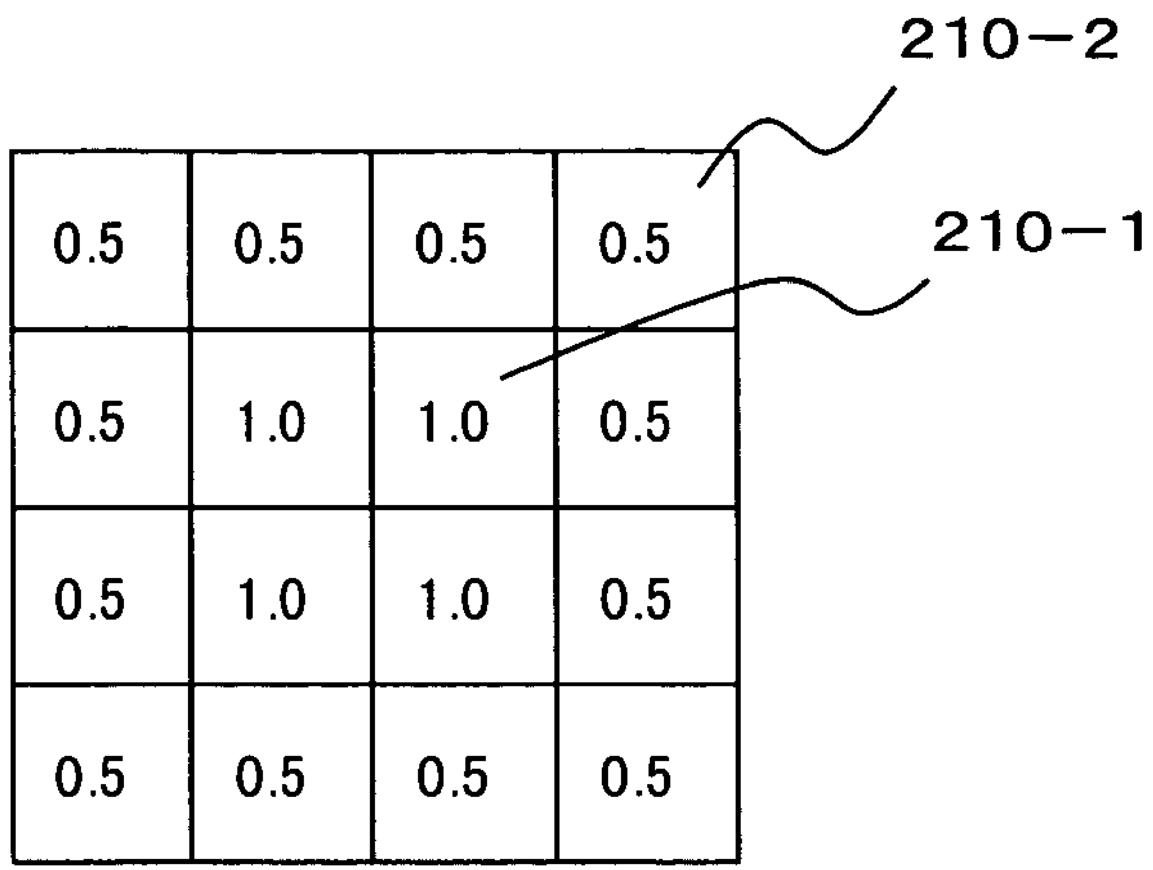
FIG. 15 is an illustration showing a setting example of a position coefficient.

In this case, the position coefficient Cpi is previously determined to increase so that the parent block i is closer to the center of the image. This is because a block closer to the center of an image is considered to have a higher importance in an image. By providing a high position coefficient for a block having a high importance in position, the color of a block having a high importance is strongly reflected through white balance control. FIG. 15 is an illustration showing a setting example of a position coefficient. In the case of this example, 1.0 is provided for a block 210-1 at a central portion of the image as a position coefficient and 0.5 is provided for a block 210-2 at a marginal portion of the image. These position coefficients are previously stored in an apparatus.

Moreover, in the case of the correction processing, the dispersion coefficient Cvi, saturation coefficient Csi, and exception coefficient Cdi are also considered. This has the following significance.

First, the dispersion coefficient Cvi is determined such that, as the dispersion of pixel values increases in the parent block i, the value of the dispersion coefficient Cvi decreases as previously described. Therefore, as the dispersion of the parent block i increases, the dispersion coefficient Cvi decreases, and as a result, the value of the corrected reliability Rmij also decreases. The above correction is performed because, as the dispersion of pixel values in the parent block i increases, the reliability of the reliability Rij obtained from the typical value (Li,ui,vi) of the parent block is considered to lower. In view that, as dispersion increases, the fluctuation of each pixel value of the parent block increases, the probability that the typical value obtained from the pixel value shows the trend of the parent block color (trend of illumination) is considered to below. Therefore, the reliability Rij obtained from the typical value having a low reliability is considered to have a low reliability. Therefore, in order to decrease the influence of the reliability Rij on white balance, the value of the dispersion coefficient Cvi is decreased.

Moreover, in the case of the saturation coefficient Csi, as the number of saturated pixels in the parent block i increases, the value of the saturation coefficient Csi decreases as described above. Therefore, as the number of saturated pixels in the parent block i increases, the saturation coefficient Csi decreases, and, as a result, the reliability Rij is corrected to a small value. This correction is performed because, as the number of saturated pixels in the parent block i increases, the reliability of the reliability Rij obtained from the typical value (Li,ui,vi) of the block is considered to lower. In the case of a saturated pixel, because a portion exceeding the upper limit value of RGB components may be cut, the correct color of an object may fail to be shown. Therefore, as the number of saturated pixels increases, the probability that the typical value of a parent block shows the trend of the color of the parent block (therefore, trend of illumination) is considered to become lower. Reliability of the reliability Rij obtained from the typical value having a low reliability is considered to be low. Therefore, in this case, the value of the saturation coefficient Csi is decreased in order to decrease the influence of the reliability Rij on white balance.

Moreover, as described above, the value of the exception coefficient Cdi increases as the number of child blocks decided as exceptions by the child block selecting circuit 123 decreases. Therefore, as the number of exception child blocks increases, the exception coefficient Cdi of the parent block i decreases and as a result, the value of the corrected reliability Rmij also decreases. This correction is performed because the parent block i having more child blocks becoming exceptions exhibits fluctuation in RGB values of each pixel included in the parent block i, and a typical value obtained from the average of all pixels may fail to show the correct color of an object. Therefore, as the number of exception child blocks increases, the probability that the typical value of the parent block i shows the trend of the color of the block (therefore, trend of illumination) is considered to become lower. Because the reliability Rij obtained from the typical value having a low reliability is considered to have a low reliability, the value of the exception coefficient Cdi is decreased in order to decrease the influence of the reliability Rij on white balance.

In the case of the reliability correcting circuit 135, correction of reliability is executed for each light source for all parent blocks. The obtained corrected reliability Rmij is input to a general reliability calculating circuit 136 and a light-source contribution calculating circuit 137.

The general reliability calculating circuit 136 calculates reliability of the light source i for the whole image (referred to as general reliability). The general reliability calculating circuit 136 obtains the general reliability Rtj by totaling the corrected reliability Rmij of each parent block for all parent blocks in an image. That is, the general reliability Rtj is obtained from the following expression.

$$Rtj=\Sigma Rmij \text{ (in this case, } \Sigma \text{ denotes the sum for } i=1 \text{ to } n) \quad (8)$$

The light-source contribution calculating circuit 137 estimates the reliability for each light source j and the contribution component of each light source j to the whole image on the whole scene of an image. The light-source contribution component of the light source j is the influence of each light source j on the hue of the whole image. In other words, the component is the trend of a color estimated to appear on the image when the light source j illuminates the scene of the image. The light-source contribution component is represented by a set consisting of luminance and color difference. In this case, the contribution component of the light source j to the whole image is represented as (Lcj,ucj,vcj).

The light-source contribution calculating circuit 137 estimates a light-source contribution component in accordance with the corrected reliability Rmij to each assumed light source j, the typical value (Li,ui,vi) of each parent block, and general reliability Rtj of each light source and the following expression.

$$Lcj = \frac{\sum Rmij \cdot Li}{Rtj} \quad ucj = \frac{\sum Rmij \cdot ui}{Rtj} \quad vcj = \frac{\sum Rmij \cdot vi}{Rtj} \tag{9}$$

In expression (9), Σ denotes the total for i=1 to n (n is the total number of parent blocks). This calculation is equivalent to the processing for weight-averaging the luminance and color difference of each parent block i for all parent blocks in accordance with the corrected reliability Rmij of each parent block i.

A light-source contribution correcting circuit 138 corrects an estimated value in which the contribution component of each light source j to the whole scene of the input image is estimated as described above. This correction is roughly divided into two stages.

In the first stage, the contribution component of each light source j is weight-averaged with a standard color predetermined for each assumed light source j. The standard color of the light source j is a standard color (that is, a set consisting of luminance and color difference) of a scene under illumination of the light source j, which is obtained by previously photographing various scenes by the light source j and aggregating luminances and color differences of these photographed images. The standard color (Lsj,usj,vsj) of each light source j is previously stored in an apparatus. The correction processing at the first stage is represented by the following expression.

$$Lmj=wsj\cdot Lcj+(1-wsj)\cdot Lsj \quad umj=wsj\cdot ucj+(1-wsj)\cdot usj \quad vmj=wsj\cdot vcj+(1-wsj)\cdot vsj \tag{10}$$

In this case, (Lmj,umj,vmj) is the correction result of a contribution component, and wsj (0≦ws≦1) is a predetermined weight. The weight wsj is previously obtained through an experiment on each assumed light source j and is stored in an apparatus.

The correction in the first stage is correction for reducing the influence of an object color included in a light-source contribution component (Lcj,ucj,vcj). A color appearing on an image is influenced by the color (illumination color) of the illumination light from a light source and the color of an object (object color). White balance is performing color correction so that a white object is seen as white in accordance with the color temperature of illumination light. Therefore, when the color of illumination light can be accurately estimated, accurate white balance adjustment can be performed. However, because most actual images are obtained by photographing scenes including many objects having colors other than white, many influences of an object colors are included in the color of an image. Weight-averaging a light-source contribution component and the standard color of the light source j enables relative reduction in the influence of an object color included in a light-source contribution component and correction of the light-source contribution component to a value closer to the color of illumination.

In the second stage, correction considering object luminance is applied to the correction result (Lmj,umj,vmj) obtained in the first stage. The object luminance Lo is detected by an object luminance detector 30 set to a camera. In the case of the correction in the second stage, the light-source contribution correcting circuit 138 first individually obtains a correction coefficient Coj for each assumed light source j. The correction coefficient Coj is obtained by applying the object luminance Lo to a function hj individually prepared for each light source j. That is, Coj is obtained from the following expression.

$$Coj=hj(Lo) \tag{11}$$

Figure 16:
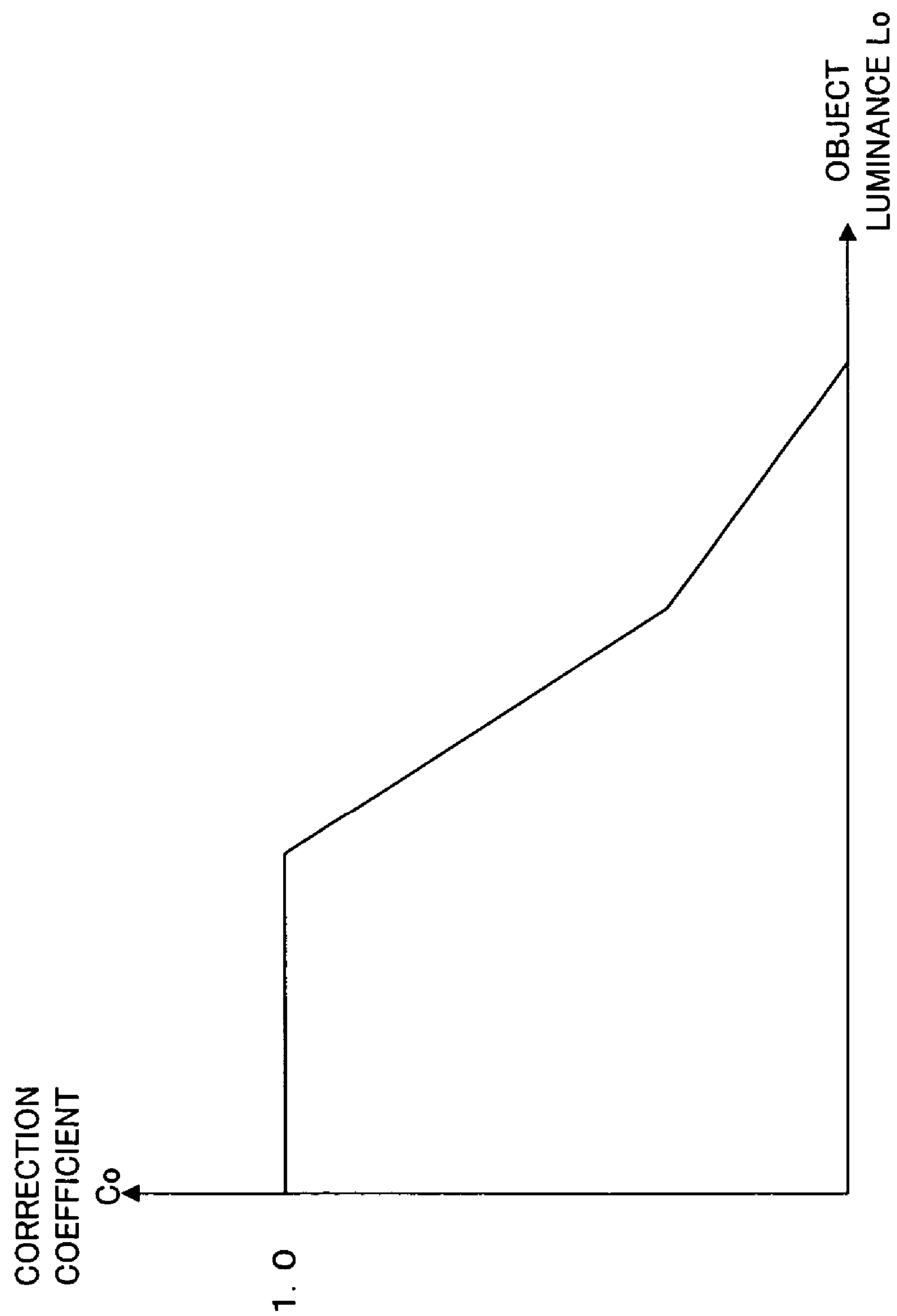
FIG. 16 is an illustration showing an example of a function for obtaining a correction coefficient in accordance with object luminance.

FIG. 16 shows an example of the correction function hj according to object luminance. In this example, as the object luminance Lo increases, the correction coefficient Co decreases. When the object luminance exceeds a certain value, the correction coefficient becomes 0. This is an example of the function hj when a light source is fluorescent light. When a photographing scene is a under fluorescent light, an object is dark as compared with the case in which a scene is outdoors in the daytime. When object luminance is very large, the probability that an image is a photographed outdoor scene is high, but the probability that fluorescent illumination is used is low. Therefore, in the case of a fluorescent light source, the correction coefficient has a smaller value as object luminance increases. Also in the case of a scene using tungsten light or shade light, object luminance is considered to be low as compared with a daylight scene.

Therefore, a function hj is used, in which the correction coefficient Co decreases when object luminance rises to a certain degree or more. These correction functions hj are previously obtained through experiments and stored in an apparatus.

Then, the light-source contribution correcting circuit 138 obtains a final correction result (Lzj,uzj,vzj) by multiplying the correction result (Lmj,umj,vmj) obtained in the first stage by the thus-obtained correction coefficient Co. That is, Lzj is obtained from the following expression.

$$Lzj=Coj\cdot Lmjuzj=Coj\cdot umjvzj=Coj\cdot vmj \tag{12}$$

The correction result (Lzj,uzj,vzj) is a light-source contribution component corrected by considering a parameter such as object luminance. The correction result is input to an illumination color estimating circuit 139.

The illumination color estimating circuit 139 estimates the color of illumination for illuminating a photographing scene of the image concerned in accordance with the correction result (Lzj,uzj,vzj) of the light-source contribution component of each light source j input from the light-source contribution correcting circuit 138 and the general reliability Rtj of each light source j to the whole scene obtained by the general reliability calculating circuit 136. This estimation is performed by weight-averaging the correction result (Lzj,uzj, vzj) of a light-source contribution component on all assumed light sources by using as weight the general reliability Rtj of each light source. That is, when an illumination color is taken as (IL,Iu,Iv), the following expression is obtained.

$$Wj = \frac{Rtj}{\sum Rtj} \tag{13}$$

$$IL = \sum (Wj * Lzj)$$

$$Iu = \sum (Wj * uzj)$$

$$Iv = \sum (Wj * vzj)$$

In expression (13), Σ denotes the total for all assumed light sources.

That is, the illumination color estimating circuit 139 estimates the illumination color of composite illumination in accordance with weight averaging when a scene is assumed to be compositely illuminated by assumed light sources j. The illumination color corresponds to the color of a white object under the composite illumination. The obtained illumination color (IL,Iu,Iv) is input to the white balance gain calculating circuit 140.

The white balance gain calculating circuit 140 calculates the gains (Rgain, Ggain, and Bgain) for white balance adjustment in accordance with the information on the received illumination color (IL,Iu,Iv). These calculations are performed in accordance with the following expressions.

$$\begin{pmatrix} IR \\ IG \\ IB \end{pmatrix} = \begin{pmatrix} 1 & -1 & -1 \\ 1 & 1 & 0 \\ 1 & -1 & 1 \end{pmatrix} \begin{pmatrix} IL \\ Iu \\ Iv \end{pmatrix} \tag{14}$$

$$\text{IMax} = \max(IR, IG, IB) \tag{15}$$

$$\text{Rgain} = \text{IMax}/IR,\ \text{Ggain} = \text{IMax}/IG,\ \text{Bgain} = \text{IMax}/IB \tag{16}$$

(IR, IG, and IB) is RGB expression of an illumination color. The white balance gains (Rgain, Ggain, and Bgain) to be obtained become values for correcting the color (that is, IR, IG, and IB) when illumination of the color is reflected by a white object to gray (that is, R=G=B). The obtained white balance gain is input to the white balance adjusting circuit 150.

The white balance adjusting circuit 150 adjusts the white balance of an image by multiplying pixel values R, G, and B input from the image pickup device 20 by gains (Rgain, Ggain, and Bgain) obtained by the white balance gain calculating circuit 140. Therefore, outputs (Rout, Gout and Bout) obtained by the following expression are output from the auto white balance apparatus 10.

$$\text{Rout} = \text{Rgain}*R,\ \text{Gout} = \text{Ggain}*G,\ \text{Bout} = \text{Bgain}*B \tag{17}$$

Embodiment 1 selects child blocks satisfying a predetermined condition by dividing a parent block into child blocks and comparing the typical color difference of the parent block with the typical color difference of each child block included in the parent block, and recalculates the typical value of the parent block by using only the selected child blocks. Moreover, the embodiment 1 also downwardly adjusts the reliability of the parent block in accordance with the number of non-selected child blocks. Thus, according to embodiment 1, even if a chromatic object is present in each block or values of RGB in the block are not uniform, stable white balance adjustment can be performed.

A second embodiment (hereafter referred to as embodiment 2) of the present invention is described below by reference to the accompanying drawings.

Figure 17:
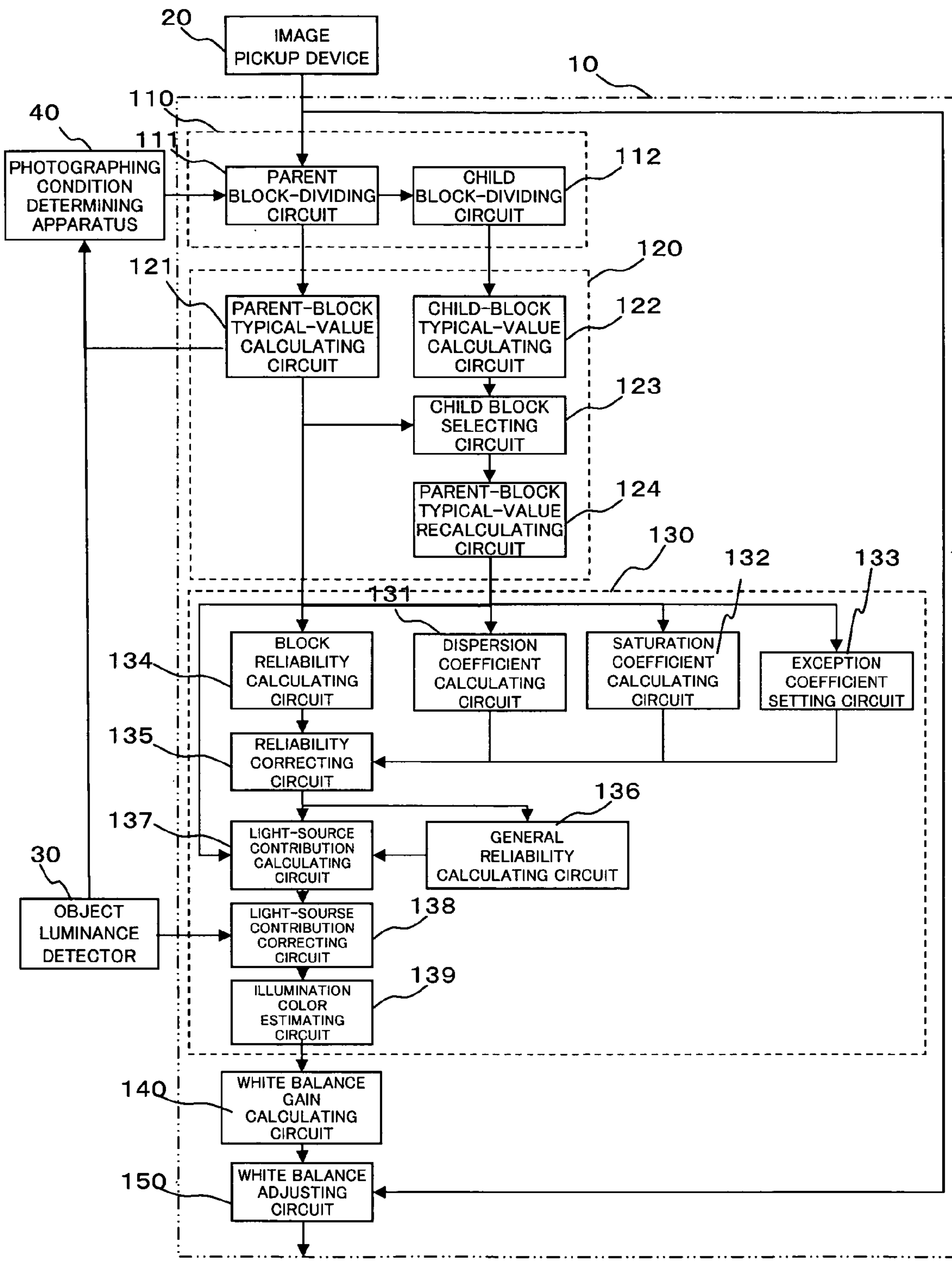
FIG. 17 is a functional block diagram showing in grater detail a configuration of an auto white balance apparatus of embodiment 2.

FIG. 17 is a functional block diagram showing the detailed configuration of the auto white balance apparatus 10 of embodiment 2. Embodiment 2 differs from embodiment 1 in that a photographing condition determining apparatus 40 is added. The photographing condition determining apparatus 40 determines whether to perform the processing for dividing a parent block into child blocks and recalculating the typical value of the parent block in accordance with object luminance, and outputs a designation for child-block division processing to the block-dividing circuit 110. The block-dividing circuit 110 divides the input image data into parent blocks, and only when a designation for child block division processing is input from the photographing condition determining apparatus 40, divides each parent block into child blocks.

Figure 18:
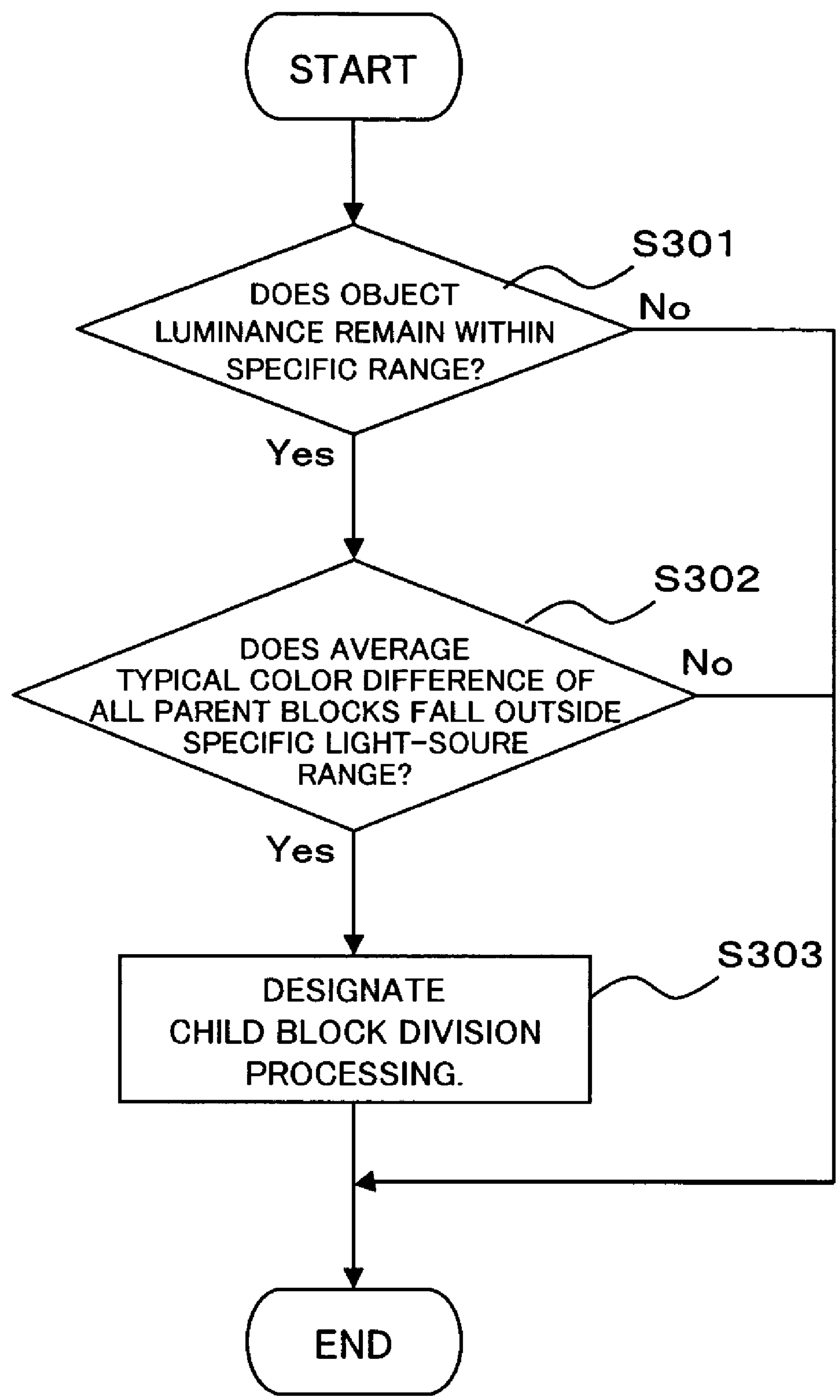
FIG. 18 is a flowchart showing a procedure of determining whether to execute the division processing of child blocks performed by a photographing condition determining apparatus of embodiment 2.

The procedure for determination by the photographing condition determining apparatus 40 is described below by reference to the flowchart shown in FIG. 18.

The photographing condition determining apparatus 40 determines whether the object luminance Lo output from the object luminance detector 30 remains within a specific range (S301). In this case, the specific range denotes a luminance range which can be taken by a plurality of light sources. In the case of embodiment 2, a range which can be assumed by daylight and tungsten light is determined as a luminance range. In the case of embodiment 2, a luminance range is determined as 6 LV to 8 LV. When object luminance is present in this range, stable white balance adjustment may be impossible to perform by generating only a parent block, calculating the typical value of each parent block, and estimating the light source of an input image in accordance with the typical value. Therefore, embodiment 2 generates a child block in the case of the photographing condition and recalculates the typical value of a parent block to realize more stable white balance adjustment.

When a result of determination in S301 shows object luminance remains within a specific range, the photographing condition determining apparatus 40 further obtains the typical color difference of each parent block calculated by the parent-block typical value calculating circuit 121 and obtains the average value of the typical color differences. Moreover, the apparatus 40 determines whether the averaged typical color difference remains within a specific light-source range (S302). When the averaged typical color difference falls outside the specific light-source range, the apparatus 40 outputs to the block-dividing circuit a designation for child block division processing (S303). In contrast, when a result of the determination in S301 shows that the object luminance falls outside a specific range or the averaged typical color difference remains within the specific light-source range, the apparatus 40 does not output the designation for child block division processing. Therefore, in this case, the apparatus 40 generates only parent blocks, estimates the light source of an input image by using the typical value of each parent block calculated by the parent-block typical value calculating circuit 121, and performs white balance adjustment.

Figure 19:
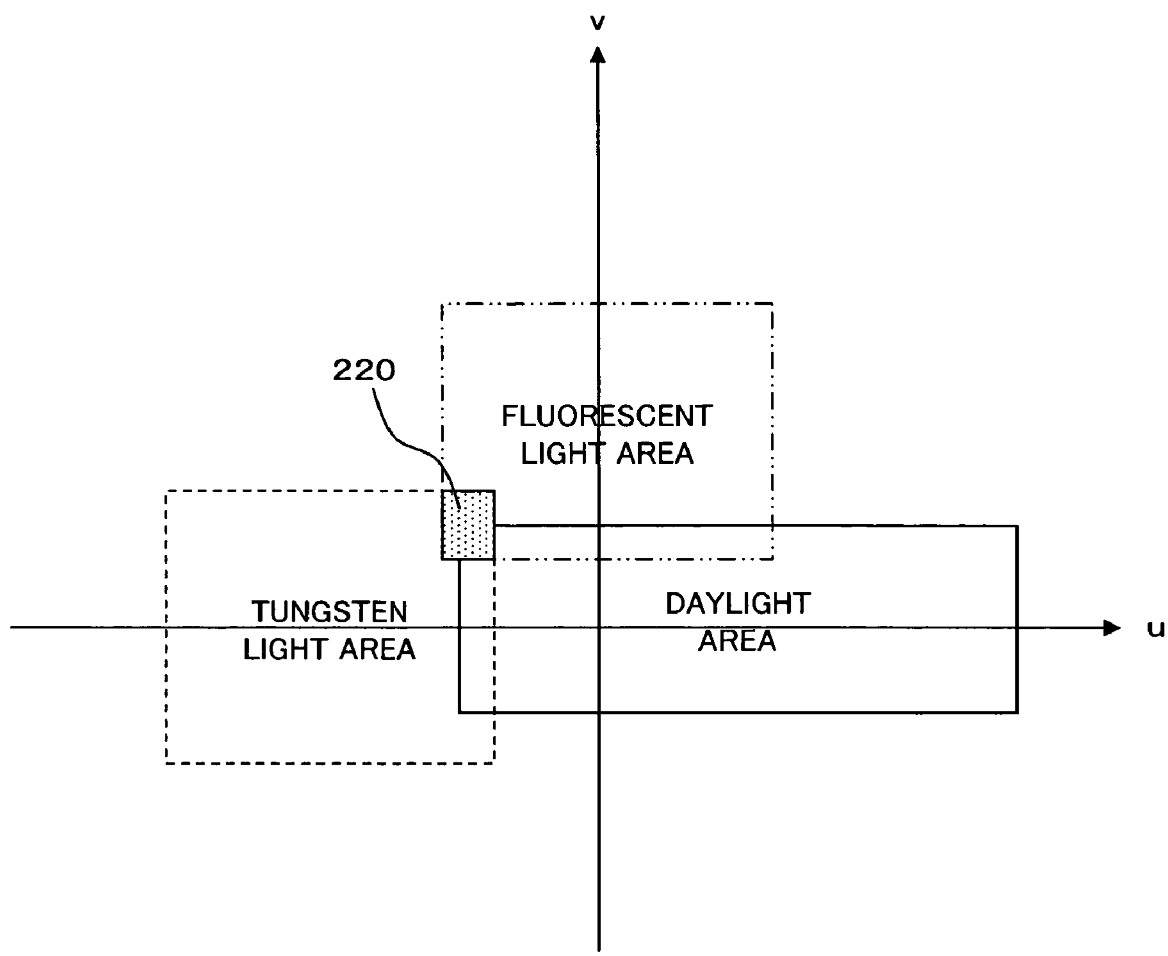
FIG. 19 is an illustration showing an area on a color difference plane of a specific light source determined to be the result of not executing division processing of a child block performed by a photographing condition determining apparatus.

In this case, a specific light-source range is an area which can be assumed by a plurality of light sources among light source areas defined on a color difference plane and a range which frequently fails to attain white balance adjustment particularly when executing child block division processing and performing white balance adjustment. As shown in FIG. 19, in the case of embodiment 2, the range is a range 220 which can be assumed by tungsten light and fluorescent light as a light source. This is because under a photographing condition in which tungsten light and fluorescent light are mixed as a light source, when child block division processing is executed and white balance adjustment is performed, white balance adjustment frequently fails.

Figure 20:
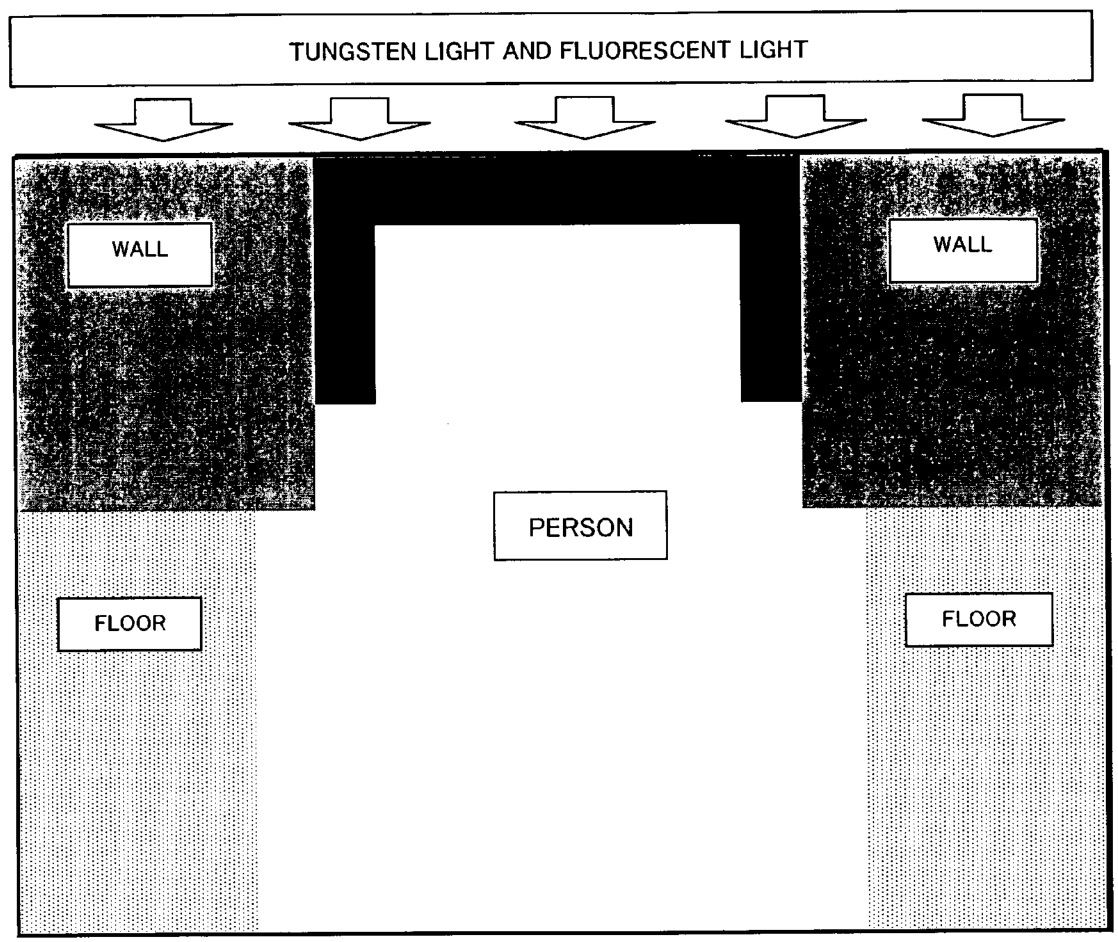
FIG. 20 is an illustration showing an example of a photographing scene in which tungsten light and fluorescent light are mixed.
Figure 21:
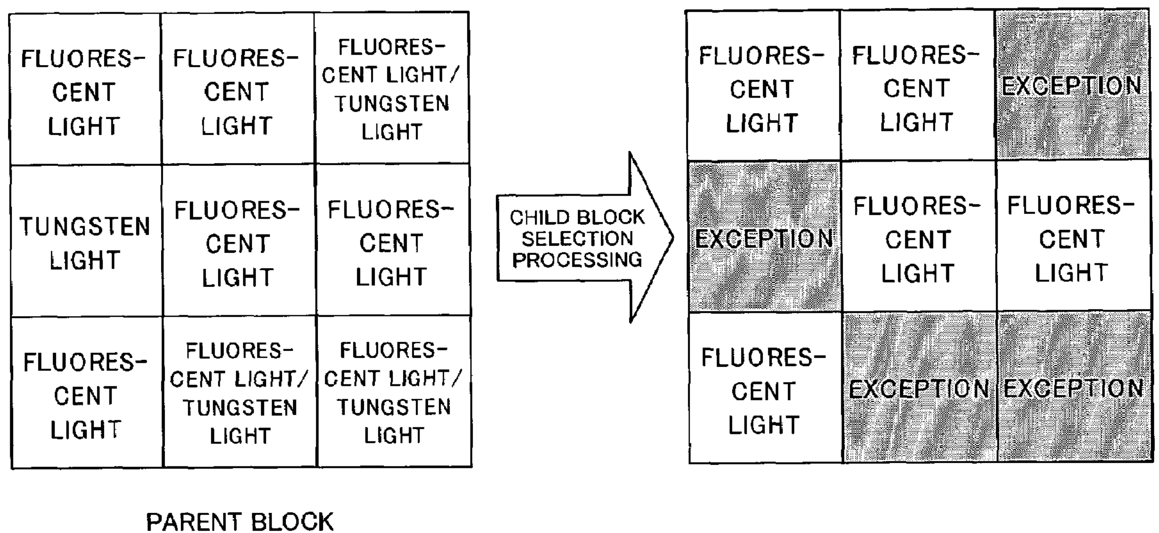
FIG. 21 is an illustration for explaining a selection result when selecting a child block in a photographing scene in which tungsten light and fluorescent light are mixed.

As a photographing scene in which tungsten light and fluorescent light are mixed, there may be included a scene at a site such as a shopping mall in which a passage side is illuminated by tungsten light and an in-store side is illuminated by fluorescent light. FIG. 20 shows an example of a photographing scene in which tungsten light and fluorescent light are mixed. In this scene, when a block is divided into child blocks and a child block is selected, the child block selection processing shown in FIG. 21 is performed. That is, because of an environment in which tungsten light and fluorescent light are mixed, when the image data for the scene shown in FIG. 20 is divided into parent blocks, there appears a parent block which includes a child block whose light source is fluorescent light, a child block whose light source is tungsten light, and a child block whose light source is a mixture of fluorescent light and tungsten light. When child blocks in the parent block are selected by the child block selecting circuit 123, only a child block whose light source is fluorescent light is left and the typical value of the parent block is recalculated. Then, the light source of the parent block is correctly determined as fluorescent light. However, because the number of child blocks which become exceptions is large, the reliability of the parent block is set low and on the whole, the influence of the parent block is decreased in image light source estimation. As a result, the influence of tungsten light becomes strong despite use of a scene including fluorescent light and tungsten light, and white balance adjustment is performed to a bluish scene as a whole.

However, when the typical value of the parent block is calculated without generating child blocks on a scene in which tungsten light and fluorescent light are mixed, reliability is obtained despite the exception coefficient Cd not being considered. As a result, there can be performed white balance adjustment in which fluorescent light and tungsten light are balanced.

As described above, in the case of a photographing condition in which tungsten light and fluorescent light are mixed, white balance adjustment is correctly performed by estimating the light source of an image in accordance with the typical value of a parent block obtained without generating child blocks. Therefore, in the case of embodiment 2, a designation for child block division processing is not output to the block dividing circuit 110 in an environment in which tungsten light and fluorescent light are mixed, even when object luminance is present in a range which can be taken as daylight and fluorescent light or daylight and tungsten light.

In the case of embodiment 2, the photographing condition determining apparatus 40 decides whether to execute the processing for generating child blocks in accordance with a photographing condition. Thereby, more stable white balance adjustment can be realized in comparison with a case in which processing for recalculating the typical value of a parent block is executed.

A third embodiment (hereafter referred to as embodiment 3) of the present invention is described below by reference to the accompanying drawings.

Embodiment 3 differs from embodiment 2 in that, for every parent block, the photographing condition determining apparatus 40 determines whether a light source in which tungsten light and fluorescent light are mixed is used, and determines whether to generate child blocks. The configuration of the auto white balance apparatus 10 of embodiment 3 may be the same as the configuration of embodiment 2 as shown in FIG. 17.

Figure 22:
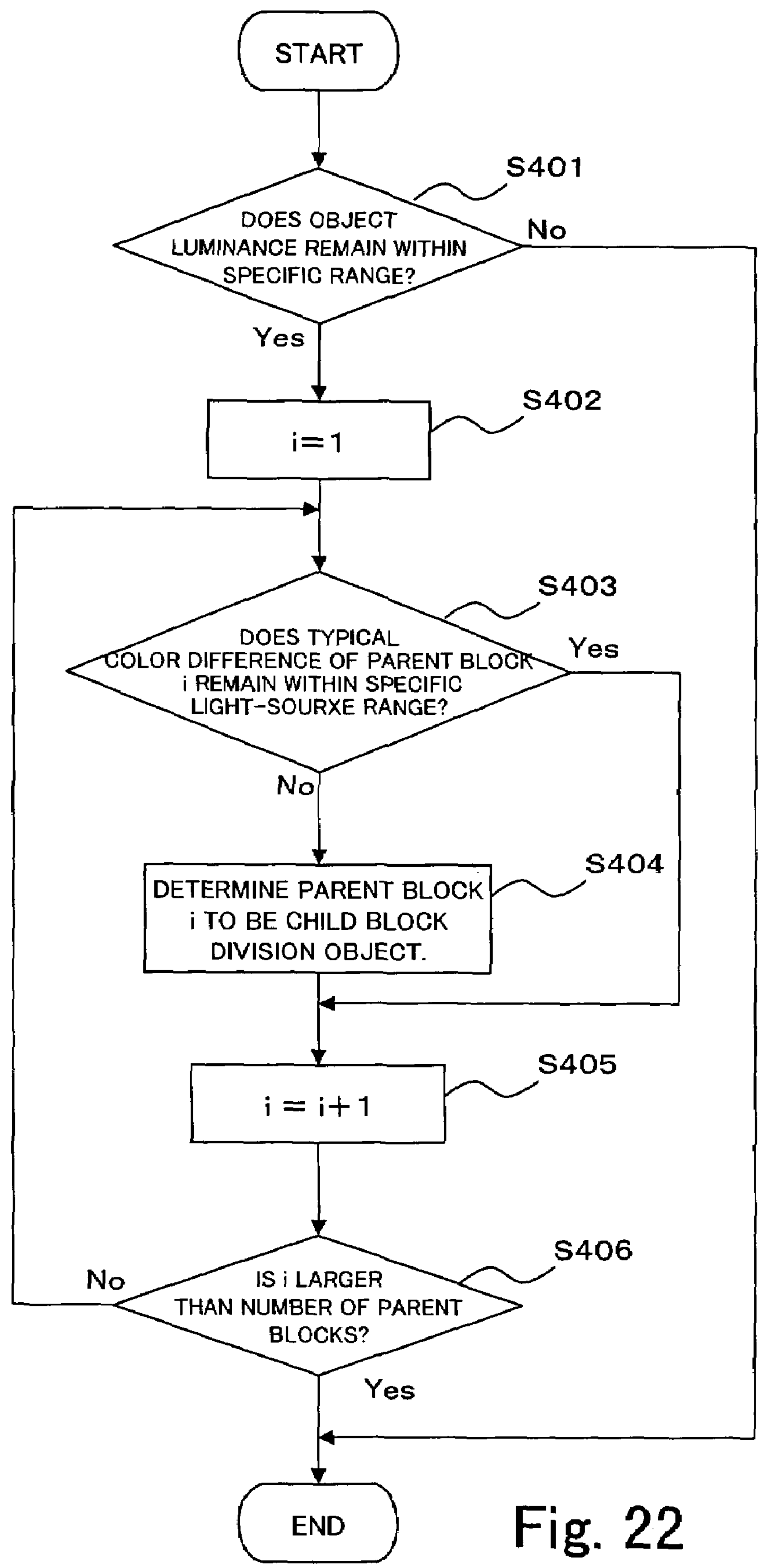
FIG. 22 is a flowchart showing a procedure of determining whether to execute division processing of a child block performed by a photographing condition determining apparatus of embodiment 3.

The procedure for determination by the photographing condition determining apparatus 40 is described below by reference to the flowchart shown in FIG. 22.

The photographing condition determining apparatus 40 determines whether the object luminance Lo output from the object luminance detector 30 remains within a specific range (S401). In this case, the specific range denotes the range of object luminance which can be assumed by daylight and fluorescent light or daylight and tungsten light as light sources.

When a result of determination shows that object luminance remains within the range, the photographing condition determining apparatus 40 sets a variable i to an initial value "1" (S402) and determines whether the typical value of the parent block i remains within a specific light-source range; that is, whether a light source is a light source in which tungsten light and fluorescent light are mixed (S403). When a result of determination shows that the light source is not a light in which fluorescent light and tungsten light are mixed, the photographing condition determining apparatus 40 determines the parent block i to be an object of a child block dividing (S404). Then, the apparatus 40 increments the variable i by 1 (S405) to determine whether the variable i is larger than the total number of parent blocks constituting image data (S406). When a result of the determination shows that the variable i is equal to or less than the total number of parent blocks constituting the image data, the apparatus 40 executes processing in and after S403 for the next parent block and completes the processing when determination has been performed for all parent blocks. The determination result in this case is input to the block dividing circuit 110, only parent blocks for child block division are divided into child blocks, and the typical values of parent blocks are recalculated.

Thus, by determining whether to generate child blocks every parent block, a typical value can be determined in accordance with a suitable method every parent block and more stable white balance adjustment can be realized. Moreover, the typical value of each parent block can be obtained more efficiently as compared with the case where child blocks are generated for all parent blocks and typical values of the parent blocks are recalculated.

Figure 23:
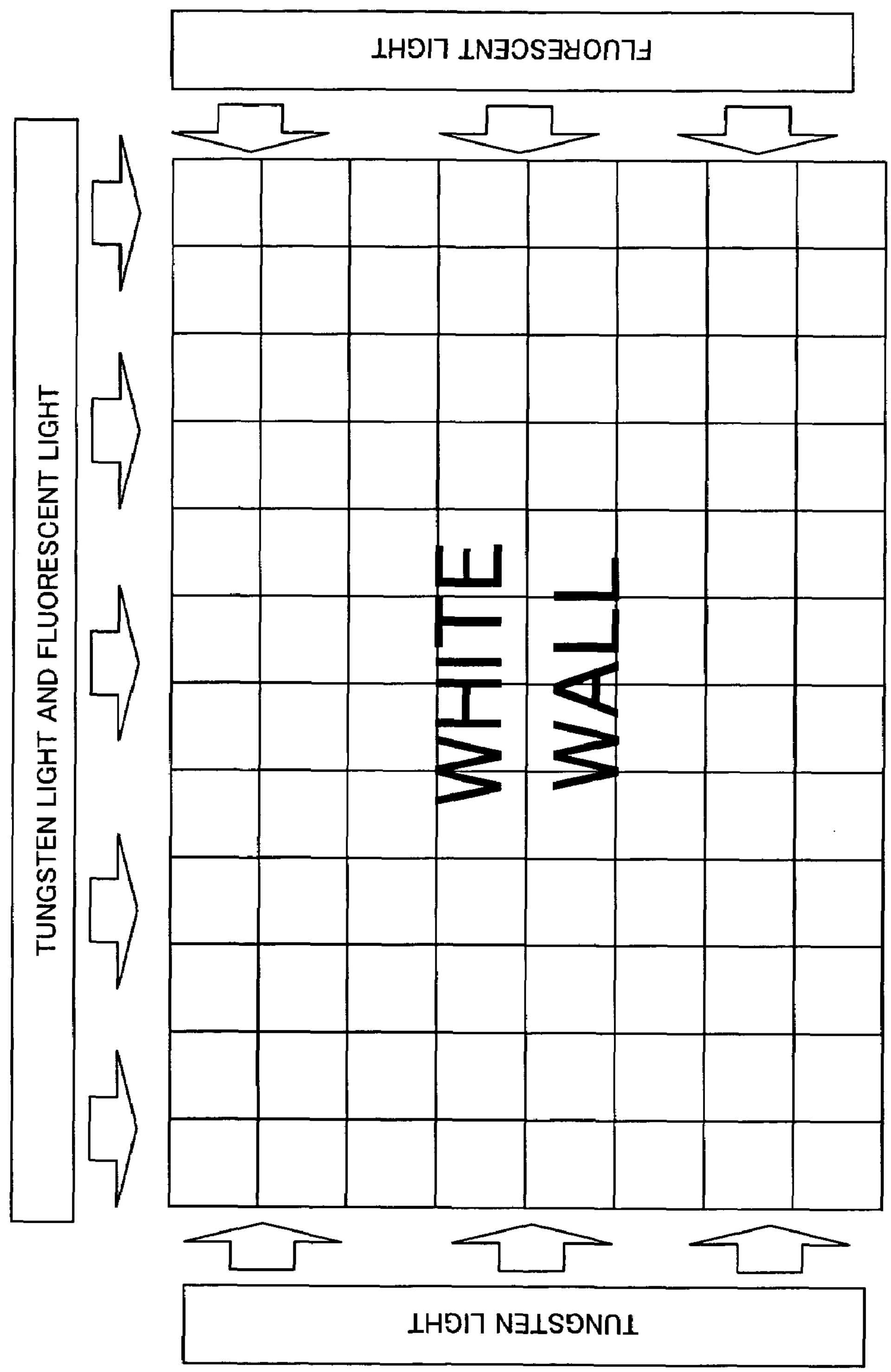
FIG. 23 is an illustration showing an example of a scene in which tungsten light and fluorescent light are applied as light sources to a white wall.
Figure 24:
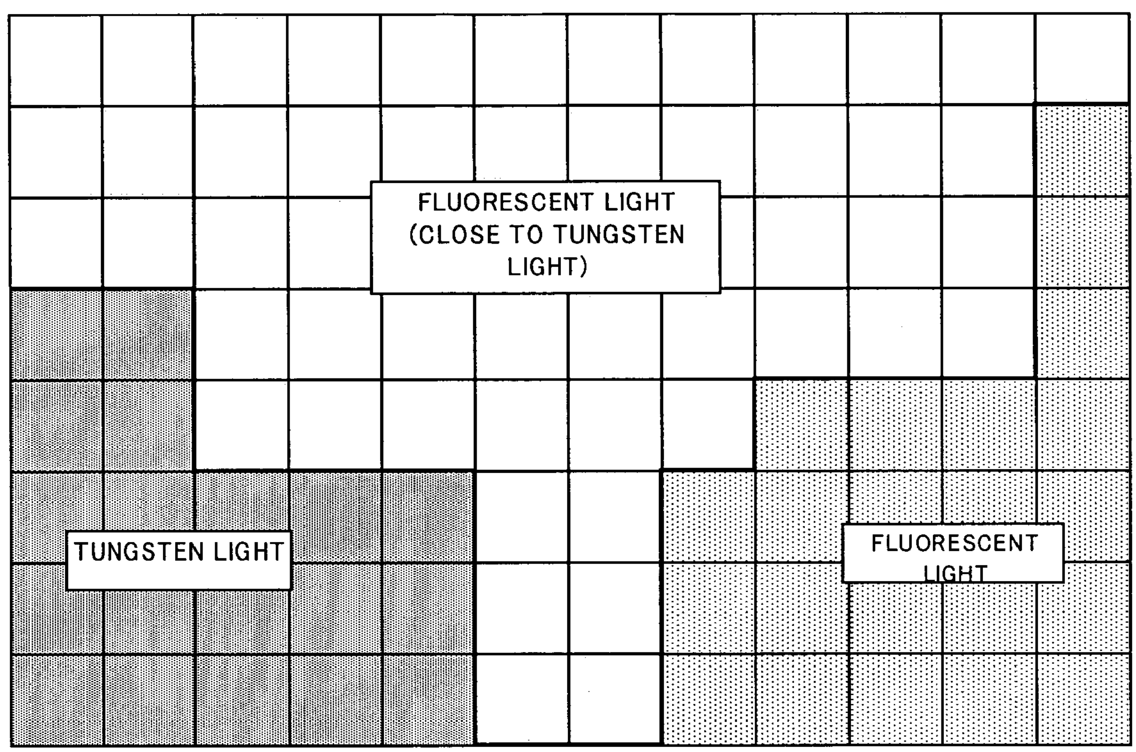
FIG. 24 is an illustration showing a light-source estimation result when the light source of each parent block is estimated by generating only parent blocks for the scene shown in FIG. 23.
Figure 25:
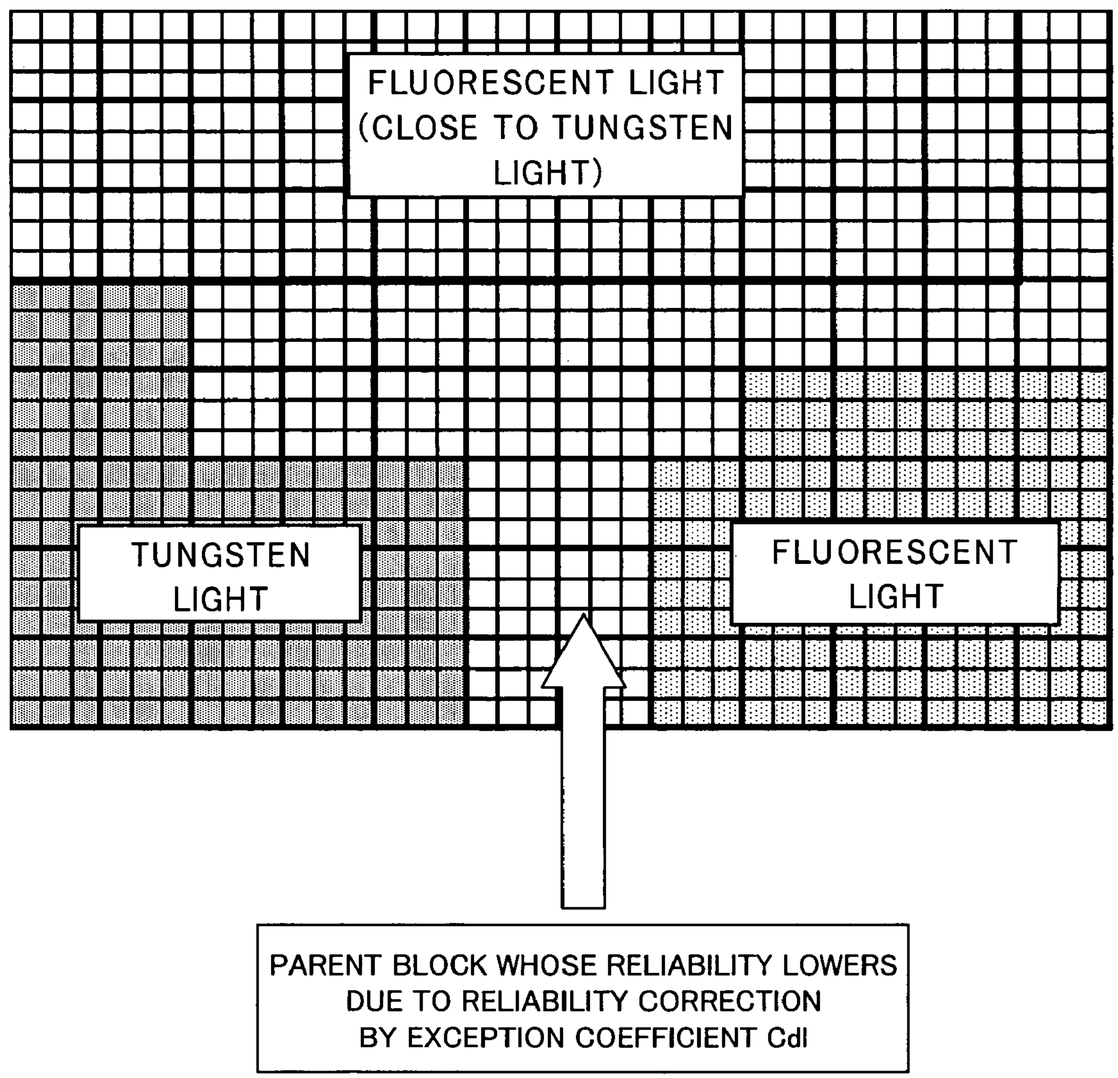
FIG. 25 is an illustration showing a light-source estimation result when the light source of each parent block is estimated by generating child blocks in all parent blocks for the scene shown in FIG. 23.

FIG. 23 shows an example of a scene in which fluorescent light and tungsten light are applied to a white wall as light sources. FIG. 24 shows a light-source estimation result when only parent blocks are generated and the light source of each parent block is estimated. Moreover, FIG. 25 shows a light-source estimation result when child blocks are generated for all parent blocks and the light source of each parent block is estimated. Furthermore, FIG. 26 shows a light-source estimation result when child blocks are estimated by excluding parent blocks respectively having a light source in which fluorescent light and tungsten light are mixed and the light source of each parent block is estimated.

When white balance adjustment is applied to the scene shown in FIG. 23 in accordance with a result of light source estimation performed by generating only parent blocks, the adjustment is performed by strongly receiving influences of tungsten light and fluorescent light close to tungsten light. Therefore, the white balance adjustment is applied to a bluish scene as a whole. However, when generating child blocks, the number of parent blocks whose light sources are estimated as fluorescent light close to tungsten light is decreased, and tungsten light and fluorescent light are balanced, whereby white balance adjustment is performed as shown in FIG. 25.

Figure 26:
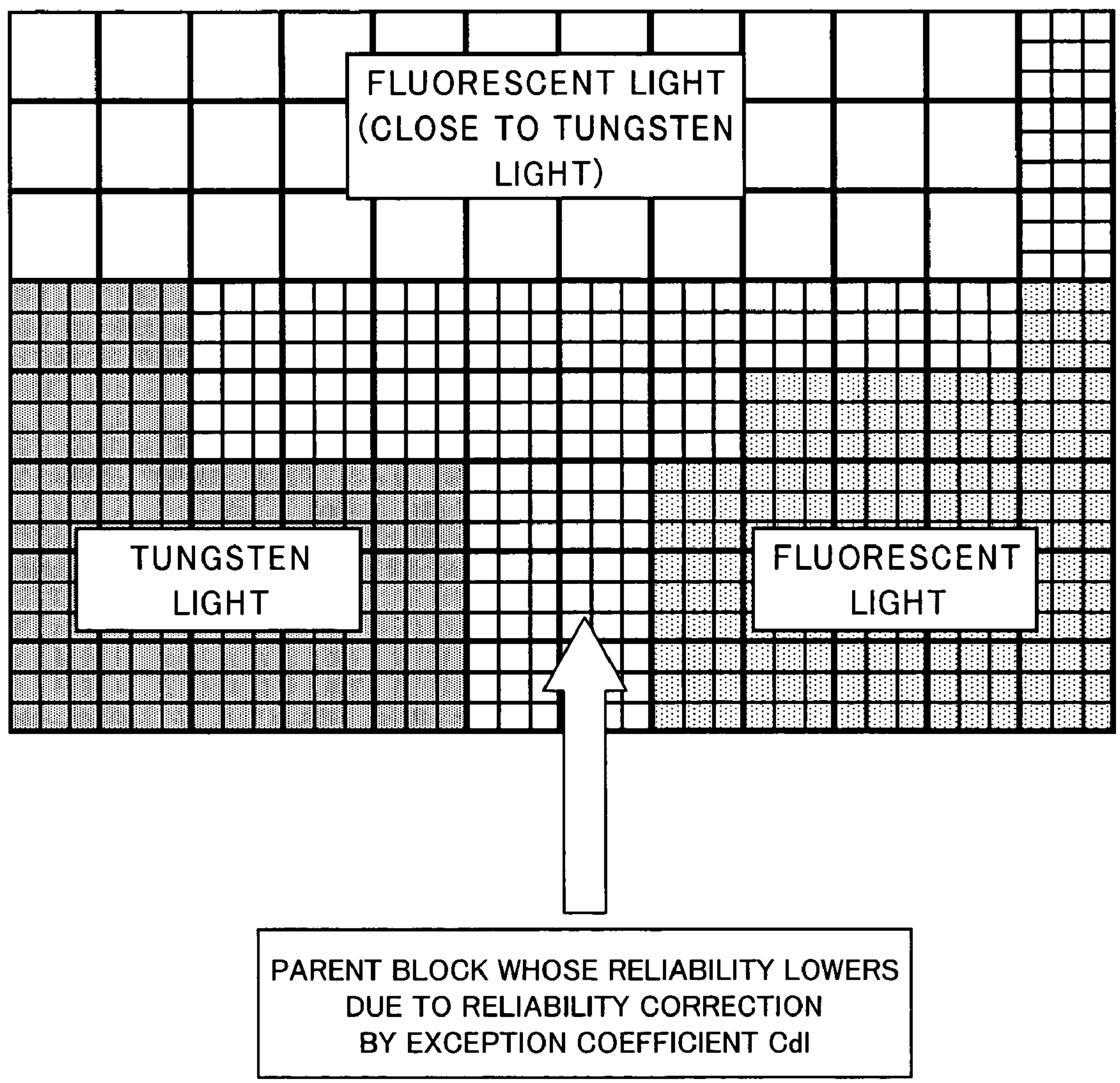
FIG. 26 is an illustration showing a light-source estimation result when child blocks are generated by excluding parent blocks respectively having a light source in which fluorescent light and tungsten light are mixed for the scene shown in FIG. 23 and the light source of each parent block is estimated.

Moreover, when child blocks are generated by excluding parent blocks respectively having a light source in which fluorescent light and tungsten light are mixed, tungsten light and fluorescent light are balanced and white balance adjustment is performed as shown in FIG. 26. Therefore, like the case of embodiment 3, even when determining whether a light source in which tungsten light and fluorescent light are mixed is used and whether to generate child blocks every parent block, white balance adjustment can be performed in almost the same manner as in the case where child blocks are generated for all parent blocks.

Each of the above embodiments properly divides a parent block into child blocks; calculates a typical value for every child block; compares the typical color difference of a parent block with the typical color difference of each child block included in the parent block, thereby selecting child blocks satisfying a predetermined condition; and recalculates typical values of parent blocks by using only the selected child blocks. Moreover, each embodiment downwardly corrects reliabilities of parent blocks in accordance with the number of unselected child blocks. Therefore, according to each embodiment, even when a chromatic object is present in each block or values of RGB in a block are not uniform, stable white balance adjustment can be performed.

Figure 27:
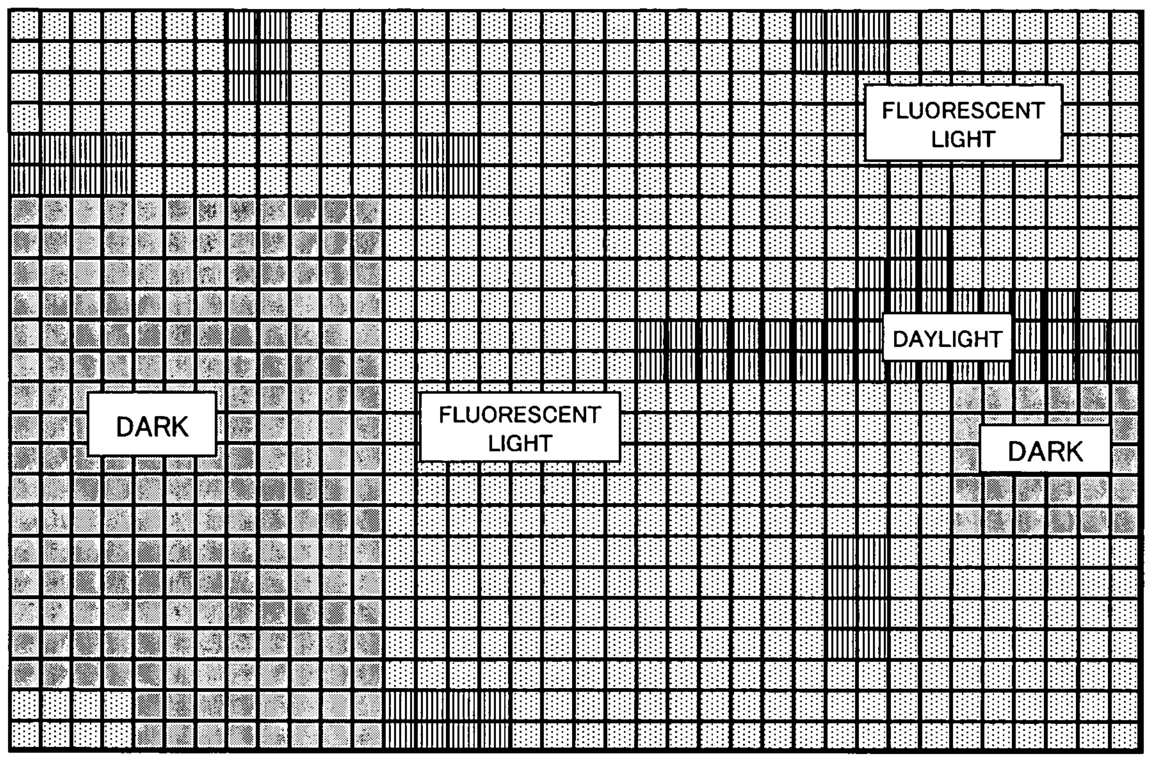
FIG. 27 is an illustration showing a light-source estimation result when an image is simply divided into child blocks and light source estimation is performed for the scene shown in FIG. 8.

There is also considered a method of simply generating only child blocks without distinguishing between a parent block and a child block, obtaining a typical value every child block, and estimating a light source in accordance with the typical value of each child block. However, in this method, white balance adjustment cannot be properly performed, because reliabilities of parent blocks corresponding to the number of unselected child blocks are not corrected downward. That is, for example, when the scene shown in FIG. 8 is simply divided into child blocks and a light source is estimated, the result shown in FIG. 27 is obtained. That is, although child blocks include a child block whose light source is estimated to be daylight, child blocks whose light sources are estimated as fluorescent light prevail. Moreover, because the reliability of a child block whose light source is estimated as fluorescent light is not corrected downward, when white balance adjustment is directly performed, white balance is adjusted to a purplish color as a whole, because it is strongly influenced by fluorescent light. Therefore, when child blocks are simply generated; that is, when block-dividing image data are divided more minutely than ever and a light source is estimated in accordance with the typical value of each child block, the advantages of the respective embodiments cannot be attained.

What is claimed is:

1. An auto white balance apparatus for applying white balance adjustment to a picked-up image, comprising:

block-dividing means for dividing an input image into a plurality of blocks;

typical-value calculating means for calculating, for each block, a typical value including luminance and color difference representing the block in accordance with each color value in the block; and white balance adjusting means for applying white balance adjustment to the image in accordance with the typical value of each block; wherein the block-dividing means includes parent block-dividing means for dividing an input image into a plurality of parent blocks, and child block-dividing means for dividing each parent block into a plurality of child blocks;

the typical-value calculating means includes parent typical-value calculating means for calculating a typical value including luminance and color difference representing a parent block in accordance with each color value in a parent block, child typical-value calculating means for calculating a typical value including luminance and color difference representing a child block in accordance with each color value in a child block, child block selecting means for selecting several desired child blocks out of a child block group included in a parent block in accordance with comparison between parent typical color difference and child typical color difference of each child block included in the parent block, and parent typical value recalculating means for recalculating the typical value of a parent block in accordance with the typical value of each selected child block; and the white balance adjusting means performs white balance adjustment for the image in accordance with the typical value of each recalculated parent block.

2. The auto white balance apparatus according to claim 1, further comprising:

block reliability estimating means for obtaining a distance between color difference of a white object under each light source and the typical color difference of each parent block on a color difference plane on each assumed light source every parent block; and reliability correcting means for correcting the reliability of each of the parent blocks in accordance with the number of child blocks selected by the child block selecting means; wherein the white balance adjusting means performs white balance adjustment for the image in accordance with the recalculated typical value of each parent block and the corrected reliability of each parent block.

3. The auto white balance apparatus according to claim 2, wherein the reliability correcting means performs correction such that, as the number of child blocks selected by the child block selecting means decreases, the reliability of a parent block lowers.

4. The auto white balance apparatus according to claim 1, wherein:

the child block selecting means selects several desired child blocks from among a child block group included in a parent block in accordance with the distance between parent typical color difference and child color difference of each child block included in the parent block on a color difference plane.

5. The auto white balance apparatus according to claim 1, wherein:

the child block selecting means obtains the distance between parent typical color difference and child typical color difference of each child block included in the parent block on a color difference plane and selects, as desired child blocks, child blocks in which the distance is equal to or less than a predetermined threshold value.

6. The auto white balance apparatus according to claim 5, wherein the predetermined threshold value is determined in accordance with the typical color difference of each parent block.

7. The auto white balance apparatus according to claim 1, further comprising:

child block division determination means for determining whether to divide the image into child blocks in accordance with the object luminance of the image, wherein when a determination is made that the image is not to be divided into child blocks, the white balance adjusting means applies white balance adjustment to the image in accordance with the typical value of each parent block calculated by the parent typical-value calculating means.

8. The auto white balance apparatus according to claim 7, wherein the child block-dividing means determines to divide the image into child blocks when the object luminance of the image is included in a luminance range which can be assumed by a plurality of light sources.

9. The auto white balance apparatus according to claim 7, wherein when the object luminance of the image is included in a luminance range which can be assumed by daylight and fluorescent light or daylight and tungsten light, the child block division determination means determines to divide the image into child blocks.

10. The auto white balance apparatus according to claim 7, wherein:

when determining to divide the image into child blocks in accordance with the object luminance of the image, the child block division determining means further determines whether the light source of the image is estimated as a predetermined light source in accordance with the average of typical color differences of all parent blocks constituting the image, and only when the light source is estimated to not be the predetermined light source, finally determines to divide the image into child blocks.

11. The auto white balance apparatus according to claim 10, wherein:

the predetermined light source is a light source included in an area of overlap between each light source area defined on a color difference plane.

12. The auto white balance apparatus according to claim 11, wherein:

the light source included in the overlapped area is fluorescent light and tungsten light.

13. The auto white balance apparatus according to claim 7, wherein when a determination is made to divide the image into child blocks in accordance with the object luminance of the image, the child block division determination means further determines whether the light source of a parent block is estimated to be a predetermined light source in accordance with the typical color difference of each parent block constituting the image and finally determines to divide into child blocks only a parent block for which the light source is determined not to be the predetermined light source.

14. A white balance adjusting method for applying white balance adjustment to a picked-up image, comprising:

a parent block-dividing step of dividing an input image into a plurality of parent blocks;

a child block-dividing step of further dividing each parent block into a plurality of child blocks;

a parent typical value calculating step of calculating a typical value including luminance and color difference representing a parent block in accordance with each color value in the parent block;

a child block selecting step of selecting several desired child blocks from among a child block group included in the parent block in accordance with comparison between parent typical color difference child typical color difference of each child block included in the parent block;

a parent typical-value recalculating step of recalculating the typical value of a parent block in accordance with the child typical value of each selected child block; and a white balance adjusting step of applying white balance adjustment to the image in accordance with the typical value of each recalculated parent block.

15. The white balance adjusting method according to claim 14 further comprising:

a block reliability estimating step of obtaining, for every parent block, the distance between color difference of a white object and a typical color difference of each parent block on a color different plane under each light source on each assumed light source and estimating the reliability when each of the light sources illuminates the scene of each of the parent blocks in accordance with each of these distances; and a reliability correcting step of correcting the reliabilities of the parent blocks in accordance with the number of child blocks selected in the child block selecting step; wherein in the white balance adjusting step, white balance adjustment is applied to the image in accordance with the typical value of each recalculated parent block and the reliability of each corrected parent block.

16. The white balance adjusting method according to claim 14, further comprising:

a child block division determination step of determining whether to divide the image into child blocks in accordance with the object luminance of the image; wherein when a determination is made not to divide the image into child blocks, white balance adjustment is applied to the image in accordance with the typical value of each parent block calculated in the parent typical value calculating step.

* * * * *